United States Patent [19]

Knaus

[11] Patent Number: 5,763,498
[45] Date of Patent: Jun. 9, 1998

[54] MOLDABLE THERMOPLASTIC POLYMER FOAM BEADS

[76] Inventor: Dennis A. Knaus, 1 Andrews Rd., Malbern, Pa. 19355

[21] Appl. No.: 806,532

[22] Filed: Feb. 24, 1997

Related U.S. Application Data

[62] Division of Ser. No. 315,446, Sep. 30, 1994, Pat. No. 5,605,937.

[51] Int. Cl.⁶ ......................................................... C08J 9/18
[52] U.S. Cl. .................. 521/60; 521/56; 521/58; 521/59; 521/79; 521/182; 521/184; 521/189; 264/50; 264/51; 264/54; 425/451.2
[58] Field of Search ........................... 521/60, 56, 58, 521/59, 79, 182, 184, 189; 264/50, 51, 54; 425/451.2

[56] References Cited

U.S. PATENT DOCUMENTS

| | | |
|---|---|---|
| 3,075,948 | 1/1963 | Sancelli . |
| 3,126,432 | 3/1964 | Schuur . |
| 3,651,183 | 3/1972 | Hosoda et al. . |
| 3,886,100 | 5/1975 | Yasuda et al. . |
| 4,089,818 | 5/1978 | Slocumb . |
| 4,214,030 | 7/1980 | Rakes et al. . |
| 4,214,054 | 7/1980 | Watanabe et al. . |
| 4,275,168 | 6/1981 | Watanabe et al. . |
| 4,399,087 | 8/1983 | Akiyama et al. . |
| 4,483,809 | 11/1984 | Ando et al. . |
| 4,493,924 | 1/1985 | Rifi . |
| 4,540,718 | 9/1985 | Senda et al. . |
| 4,606,873 | 8/1986 | Biglione et al. . |
| 4,870,111 | 9/1989 | Donuiff et al. . |
| 4,988,740 | 1/1991 | Walter et al. . |
| 5,026,736 | 6/1991 | Pontiff . |

*Primary Examiner*—Duc Truong
*Attorney, Agent, or Firm*—Dickinson Wright PLLC

[57] ABSTRACT

A continuous process for making moldable foam beads comprising a non-crosslinked or crosslinked thermoplastic polymer foam are produced by mixing a composition comprising a non-crosslinkable or crosslinkable thermoplastic polymer or a thermoplastic polymer with a crosslinking agent, additives to achieve specific properties, a blowing agent, extruding the admixture under pressure, crosslinking, when applicable, the admixture under pressure, modulating the admixtures temperature to achieve the desired foaming properties, and then expanding the admixture in a zone of lower pressure to form a foam bead that can be molded.

13 Claims, 3 Drawing Sheets

MOLDABLE THERMOPLASTIC POLYMER FOAM BEADS

This is a Divisional application of U.S. application Ser. No. 08/315,446, filed Sep. 30, 1994, now U.S. Pat. No. 5,605,937.

FIELD OF THE INVENTION

The present invention concerns a process for making moldable beads of foamed thermoplastic polymers, and particularly beads of non-crosslinked and crosslinked thermoplastic polymers, such as polystyrene and non-crosslinked and crosslinked polyolefins, as well as any other foamable crosslinked and non-crosslinked thermoplastic polymers.

BACKGROUND OF THE INVENTION

Foamable polystyrene beads are relatively easy to make. In a typical method, polystyrene resin is impregnated with an expanding agent, usually pentane, during polymerization, or else resin particles are impregnated with the expanding agent after polymerization. These particles are then subjected to steam to partially expand them.

Foamable polystyrene beads are also easy to mold. In a typical method, the pre-expanded beads are fed into a mold and subjected to pressurized steam where they expand, fuse together, and conform to the shape of the mold. Such moldings are useful as decoration, insulation, and protective packaging.

However, expanded polystyrene moldings suffer from many disadvantages. Since polystyrene exhibits poor solvent resistance and is unstable at high temperatures, moldings made from polystyrene cannot be used for many applications. Furthermore, expanded polystyrene foam is generally brittle and fragile and possesses poor cushioning properties. These properties limit its use as protective packaging for fragile items such as computers and other delicate instrumentation. In addition, polystyrene foam does not stand up well to repeated impacts. In fact, the cushioning ability of the molding is usually severely impaired after just one impact.

The preparation of thermoplastic polymer foams by extruding a heat-plastified mixture of thermoplastic resin and a blowing agent is well known in the art and is described in U.S. Pat. Nos. 2,740,157, 3,067,147, 3,413,387, 3,413,388, 3,431,163, 3,431,164, 3,808,300, 3,954,929, 3,966,381, 4,640,933, 4,663,361, and 4,694,027, and in Canadian Patent No. 451,854, as well as in other literature pertaining to the art.

U.S. Pat. No. 2,450,436 discloses a method for the preparation of cellular thermoplastic polymer products. There, a solid thermoplastic resin, e.g., polystyrene, and a normally gaseous agent such as methyl chloride, methyl ether, propylene, or butylene are held in a closed vessel under pressure at a temperature below the critical temperature of the normally gaseous agent until a homogeneous mobile gel is obtained. Thereafter, an outlet is opened to permit flow of the gel from the vessel. During flow of the mobile gel from the pressurized vessel into a zone of lower pressure, the resin is swollen by vaporization and expansion of the dissolved volatile substance to form a stable cellular product consisting for the most part of individual closed thin-walled cells.

U.S. Pat. No. 2,515,250 describes a method of forming under pressure a mixture of predetermined proportions of a normally gaseous agent and a thermoplastic resin, and storing the mixture by feeding the same into a pressurized storage vessel in which it is maintained at a desired temperature until a homogeneous mobile gel or solution is obtained, prior to extrusion and expansion of the resin.

U.S. Pat. No. 3,067,147 discloses a method for the preparation of a cellular mass from thermoplastic resin by incorporating a gas or volatile organic liquid in the thermoplastic resin to be foamed. The mixture is heated to a temperature at which it becomes plastic and vapors of gas or volatile liquid expand the softened resin to form a cellular mass.

U.S. Pat. No. 2,387,730 teaches a method of making cellular polyethylene by impregnating a molten polymer with a gas which is soluble therein under pressure. The polymer is then expanded by partially releasing the pressure while maintaining the temperature, followed by cooling the expanded polymer.

U.S. Pat. No. 3,808,300 discloses a method for the preparation of closed cellular olefin polymers using a mixture of a citric acid salt, a carbonate or bicarbonate as the nucleating agent, and n-butane-isobutane mixtures for the foaming agent.

U.S. Pat. Nos. 4,640,933, 4,633,361 and 4,64,027 disclose methods for the preparation of expandable polyolefin compositions using isobutane and mixtures of isobutane, chlorofluorocarbons and fluorocarbons or a mixture of at least 70% isobutane and other hydrocarbons as the blowing agent for long chain fatty acids with polyols.

The preparation of thermoplastic foams containing either an antistatic agent or a flame retardant agent is well known in the art and is described in U.S. Pat. Nos. 4,298,710, 4,556,680, 4,626,563, 4,293,656, 4,286,071, 4,337,319 and 4,219,466.

U.S. Pat. No. 4,298,710 describes an antistatic resin composition of 100 parts of a nitrile copolymer and 0.05 to 10 parts of a surfactant added thereto as an antistatic additive. The nitrile copolymer comprises 7 to 100% of a nitrile graft formed by polymerizing a monomer mixture of a specific composition onto a rubber trunk polymer predominantly comprising a conjugated diolefin and/or an acrylate, and 0 to 93% of a nitrile random copolymer of a specific composition.

United States Defensive Publication T953,006 (Dec. 7, 1976) describes antistatic cellular polyolefin products and articles thereof. The cellular composition includes an antistatic agent, especially an amine having at least one long aliphatic hydrocarbyl chain or a salt thereof, especially a quaternary ammonium salt.

U.S. Pat. No. 4,626,563 discloses the preparation and use of flame retardant carbonate polymers containing an aromatic sulfimide, a monomeric or polymeric halogenated organic compound, a metal sulfate having a pka from 1 to 5 and a fibril forming polytetrafluoroethylene as additives in effective amounts giving carbonate polymers that not only are flame retardant, but are melt stable (i.e. show little loss in molecular weight during processing or melt shearing).

U.S. Pat. No. 4,293,656 describes a polystyrene foam combined with a halogen-containing flame retardant and 2,2 bis(4-allyloxy-3,5-dibromophenyl) propane, which is a synergist, present in a 0.01 to 1.0 weight percent based on the weight of polystyrene.

U.S. Pat. No. 4,286,071 and 4,337,319 teaches the use of bromine compounds and one synergist to make expandable styrene polymer flame retardant.

U.S. Pat. Nos. 4,219,071 and 4,337,319 teach the use of bromine compounds and one synergist to make expandable styrene polymer flame retardant.

U.S. Pat. No. 4,219,466 describes a resin composition having high impact resistance, improved release property, and reduced flammability by mixing a polymer containing a major amount of monovinyl aromatic monomer, a block copolymer consisting essentially of styrene and butadiene, an amorphous alpha olefin polymer, a halide containing flame retardant compound, and an antimony compound.

U.S. Pat. No. 4,229,554 discloses combining an antistatic agent and a flame retardant agent into a thermoplastic resin, but does not mention potential use of the combination in a thermoplastic foam.

U.S. Pat. No. 4,556,680 describes the preparation and use of polystyrene expandable beads having antistatic properties by adding antistatic compounds to the beads during the pre-expansion step. This patent also discloses combining a flame retardant agent with the antistatic agent to make a polystyrene expandable bead that has antistatic and flame retardant properties, but no mention is made of using this technology to make polyethylene foam.

Although the foregoing references indicate that formation of a cellular thermoplastic polymer mass is well known and that numerous practical techniques are available, and further that either an antistatic agent and/or a flame retardant agent can be incorporated into the cellular thermoplastic mass, none of these references recognize or appreciate the advantages which stem from combining an antistatic agent and a flame retardant agent into non-crosslinked or crosslinked thermoplastic polymer foam bead, such as a polyolefin cellular bead, using a single extrusion process. Since it was previously impossible to obtain such non-crosslinked or crosslinked polyolefin foam beads from commercial suppliers, it has been necessary to coat polyolefin foam beads or articles made therefrom with other foams, films, foils and/or liquid or dry coatings.

In many end-use applications, it is desirable to obtain polyolefin foams that will not build up static electricity charges and will not burn. The advantages of this type of foam include safer shipping and safer warehousing or storage of sensitive electronic circuits aboard ships and planes, especially in military craft.

Foams molded from polyolefin beads overcome may of the drawbacks of thermoplastic foams, such as polystyrene foams. Some generally available polyolefin foam beads include non-crosslinked or crosslinked polypropylene or polyethylene. Both of these materials possess greater solvent resistance than polystyrene and are also more resistant to high temperature. Furthermore, polyolefin foam is much more resilient and flexible than polystyrene foam and, therefore, has greater use in the packaging of fragile items. Polyolefin foam also maintains much of its cushioning effect after even many impacts and, therefore, lends itself for use as packaging for long distance transport or reusable packages.

In the case of some thermoplastics, such as polyethylene, a substantially crystalline polymer, the temperature range for good molding of foam beads is quite narrow. If the molding temperature is too low poor fusion will result, the molding will not possess optimum tear resistance, and large voids or unfused pockets could exist in the molding. If the molding temperature is too high, the polyethylene becomes too flowable and the structural integrity of the foam is destroyed, resulting in a collapsed, misshapen molding.

To give the polyethylene a greater resistance to temperature and to widen the temperature range for molding, polyethylene is crosslinked. This allows the polyethylene foam to be molded using steam as the heat source without the polyethylene suffering decomposition.

Moldable crosslinked polyethylene foam beads are presently manufactured in several ways. Polyethylene beads containing a chemical crosslinking agent, such as dicumyl peroxide, and can be suspended in an aqueous solution and heated to the proper temperature to trigger the crosslinking reaction. Polyethylene resin can also be crosslinked by subjecting the particles to high energy radiation, such as X-rays or electron beams. The resultant crosslinked resin particles can then be impregnated with a hydrocarbon or chlorofluorocarbon blowing agents, or the like, such as butane, pentane, dichlorodifluoromethane, etc., by charging an aqueous suspension of the crosslinked polyethylene beads under pressure with the blowing agent. The solution is then heated and stirred in an autoclave to impregnate the beads with the blowing agent. Such processes are described in U.S. Pat. Nos. 4,399,087 and 4,436,840.

Since the blowing agent incorporated in the crosslinked polyethylene particles will readily dissipate, the expandable beads must be stored under pressure or at lower temperatures than ambient or, as is more often the case, immediately pre-expanded. The expansion ratio of these pre-expanded beads is usually between 10 and 45 to 1. Before molding, the beads are usually subjected to a pressurizing step wherein the beads are placed in a container which is charged with pressurized gas, usually air or a chlorofluorocarbon/air mixture. Such processes are described, for example, in U.S. Pat. Nos. 4,399,087 and 4,443,393. This seep raises the pressure of the gas inside the cells of the foam beads to above atmospheric pressure, thus imparting the additional expandability needed during molding. The beads must be molded soon after this step or the additional pressure inside the cells of the beads will be dissipated.

In another method, low density polyethylene resin and a hydrocarbon or chlorofluorocarbon blowing agent are melt mixed and extruded into strands which are cut into beads. These beads are then exposed to high energy radiation to induce crosslinking and to impart to the beads the thermal resistance needed to easily mold the particles. These beads require special molding equipment as no additional expandability is incorporated into the beads prior to molding.

The aforementioned chemical method of crosslinked polyethylene bead manufacture is disadvantageous in that a relatively large and expensive autoclave-type reactor is needed to impregnate the resin with the blowing agent. Furthermore, the method is a batch process wherein a certain quantity of the moldable crosslinked polyethylene beads are manufactured. After a batch of the beads are formed, the entire quantity must be promptly treated and/or stored. This requires large storage facilities. In addition, the beads must be pressure treated prior to molding to impart additional expandability to the foam. This process requires substantial time, as the beads will be destroyed or damaged if the pressurizing step is carried out too quickly. Therefore, large pressure containers are needed to perform the operation economically.

Using the radiation process discussed, the crosslinked beads can be made on a relatively inexpensive extruder equipped with the proper equipment for granulating the foamed extrudate. However, a relatively expensive and cumbersome radiation source is required to crosslink the foam. Furthermore, as it is generally not feasible to perform the crosslinking step at a large number of manufacturing locations, the process generally requires the crosslinking step to be performed at a single, large, central manufacturing facility, or at a handful of such facilities. Furthermore, since high energy radiation does not easily or quickly penetrate into the foamed plastic structure, the degree of crosslinking is often much less on the inside portions of the foamed beads than on the outsides, causing the beads to have deficient thermal resistance.

U.S. Pat. No. 3,413,244 discloses a process for producing cellular polyolefin products in which a particulate unfoamed polyolefin is foamed within a mold and is simultaneously grafted and crosslinked by units of compounds containing two non-conjugated ethylenically-unsaturated double bonds.

International Application No. PCT/F184/00079, International Publication Number WO 85/01944, discloses foamed, silane-crosslinked polyolefin foam cable coverings which are described as relatively hard and rigid and are produced by extruding a mixture containing polyethylene, a silane hydrolyzable with water, a condensing catalyst and a foaming agent such as water.

U.S. Pat. No. 4,333,898 discloses a method for the production of relatively high density foamed polymers (such as polyethylene) in which the polymer is mixed with a silane, which grafts thereto, and which is then extruded to provide a jacket for a cable or the like. A moist, inert gas is injected into the extruder just prior to extrusion to cause the polymer to foam and the silane-grafted polymer to crosslink.

U.S. Pat. No. 4,456,704 discloses a method for producing crosslinked polyethylene foams. The method utilizes a mixture of a polyolefin resin, a blowing agent, and, optionally, a surface active agent. The polyolefin resin contains a crosslinkable ethylene polymer having on the side chains thereof silyl groups which effect crosslinking upon contact with water. The ingredients are mixed, and the mixture is extruded into a low pressure zone where the resulting extrudate (e.g., in sheet form) is allowed to expand. The expanded extrudate is then brought into contact with a silanol condensing catalyst so that the expanded extrudate is crosslinked upon contact with water.

U.S. Pat. No. 4,606,873 discloses a process for making polystyrene beads, but does not mention polyolefins or crosslinking of the polyolefins prior to expansion.

U.S. Pat. No. 4,870,111 discloses a process for making moldable foam beads comprising a silane-crosslinked polyolefin foam. The beads are made by mixing a composition comprising a silane-modified polyolefin (such as a silane-grafted polyethylene) and a silanol condensation catalyst in an extruder to produce a melt, then injecting a blowing agent into the melt at a rate effective to produce a desired foam density in the extrudate. The foamed polyolefin is then extruded and cut to form foam beads, and the beads are exposed to moisture to produce silane crosslinking of the polyolefin foam.

The foregoing references do not disclose, recognize or appreciate the advantages of making a moldable, non-crosslinked or crosslinked thermoplastic polymer foam bead, such as those made from crosslinkable silane grafted polyolefins or chemically crosslinked polyolefins, according to the method and apparatus disclosed in the present application. The foregoing references also do not disclose, recognize or appreciate the advantages of such a method wherein the polyolefins are crosslinked before they are foamed to enhance the processing characteristics of the foam beads and to enhance the properties of the foam and articles made from the polyolefin foam beads. Such advantages include the increase of melt strength, smaller cell diameter, better cushioning characteristics, and higher melting points.

In addition, none of the aforementioned references disclose a method for the manufacture of a moldable non-crosslinked or crosslinked foam bead in which the bead comprises either (1) a non-crosslinked thermoplastic that is foamable; (2) a chemically crosslinked polyolefin, made from a mixture comprising a polyolefin with a chemical crosslinking agent that is placed in an extruder to produce a melt; or (3) a silane-crosslinked polyolefin foam made by mixing a composition comprising a silane-modified polyolefin (such as a silane-grafted polyethylene) and a silanol condensation catalyst in an extruder to produce a melt; injecting a blowing agent into the melt at a rate effective to produce a desired foam density in the extrudate; extruding the melt into a pressurized atmosphere that is sufficient to prevent appreciable expansion of the polyolefin; cutting the melt and thus forming non-foamed beads suspended in a conveying media, such as water; conveying the beads through a zone where they are crosslinked when required; conveying the beads through a zone where the temperature of the beads is regulated to a desired or effective temperature for foaming; and expelling the beads to a lower pressure where they expand to form moldable non-crosslinked or crosslinked foam beads in a continuous manner.

Improved methods of producing moldable beads of foamed thermoplastic polymers, such as polyethylene or polypropylene, are clearly needed that do not require pressure treatment or radiation and that take advantage of the cellular orientation and strength achieved when expanding a polyolefin that is at its ideal extrusion temperature and/or that is already crosslinked.

SUMMARY OF THE INVENTION

The present invention provides a method of producing moldable expanded non-crosslinked or crosslinked thermoplastic polymer foam beads that requires only relatively simple, inexpensive equipment to implement. The method is such that the beads may be produced economically at any desired location, and in any desired quantity. Thermoplastic polymer foam beads and articles made according to the method of the present invention have a composite structure made up of an antistatic agent and/or a flame retardant agent which, when combined and produced in accordance with this invention, have improved usefulness because of their properties. The new thermoplastic polymer foam beads, including polyolefin foam beads, are produced in a single operation and cost substantially less to produce than those made with a coating process or by the secondary lamination of articles made from the beads.

Various types of antistatic additives and flame-retardant agents can be used to produce the thermoplastic polymer and polyolefin foam beads of the present invention. Furthermore, the foam beads can be made into a multitude of shapes, such as sheets, rods, planks or other forms. These products may be modified further by cutting, laminating or stacking.

PREFERRED EMBODIMENTS OF THE INVENTION

These benefits and other advantages are achieved by combining antistatic and flame-retardant agents into a thermoplastic foam shape in a continuous process. The foam passes through a heated pliable state to a cooled set state during preparation, using a process described below.

Any thermoplastic polymer can be used in this invention to make moldable foam beads. One group of thermoplastics that has achieved market acceptance as a moldable foam bead is the polyolefins. Although any extrudable, foamable polyolefin composition maybe used, a polyolefin polymer that is solid under standard conditions is preferred. Exemplary preferred polyolefins include the organic addition polymers or copolymers of the monomers discussed below. Other appropriate polyolefins will be apparent to one skilled in the art.

In accordance with the present invention, moldable non-crosslinked or crosslinked polyolefin foam beads are produced. The polyolefin is preferably selected from the group consisting of medium density polyethylene, low density polyethylene, linear low-density polyethylene, polypropylene, polybutylene, and copolymers of olefin monomers having from 2 to about 8 carbon atoms, and most preferably is low density or linear low density polyethylene.

Suitable polymers of ethylene, propylene, butene-1, and isobutene can be used. Also suitable are copolymers of these monomers, ethylene/vinyl acetate copolymers, ethylene/acrylic copolymers and the like. Blends of the above-named polymers and copolymers are also included. Especially preferred thermoplastic polymers are polyethylenes, ethylene/vinyl acetate copolymers, ethylene/acrylic acid copolymers, ethylene/methyl acrylic copolymers and ionomer salts of such acid copolymers. Any thermoplastic polymer and/or blend of polymers that is substantially non-crosslinked or crosslinked and that is foamable can also be used for the process described herein.

In practice, cellular thermoplastic polymer bodies are prepared in accordance with the present invention by blending a nucleating agent with a thermoplastic such as polystyrene, a polyolefin, a crosslinkable polyolefin, or a polyolefin and a crosslinking agent. Where required, a chemical blowing agent, an antistatic agent and/or a flame retardant agent or other additives may be used to enhance specific properties. The blend is then processed under pressure and is heated in a pressure-resistant vessel at temperatures between about 150° C. to 230° C. When required, a blowing agent is injected into the vessel to form an admixture with the blend at a temperature at least as high as the melting point of the polymer, until a uniform or substantially uniform flowable gel is obtained. Thereafter, the admixture is extruded and discharged through a suitable orifice into a pressurized zone. The extruded material is cut into beads and is crosslinked when applicable, its temperature is adjusted to a desired and/or suitable range for foaming, and it is then expelled to a lower pressure where it foams and is then cooled.

The present invention provides an improved and economical method for making foam beads from thermoplastic polymers such as polystyrene or polyolefin polymers. The foam beads are normally molded into shapes that are useful for a variety of purposes, such as insulation, flotation and protective packaging. The products possess a highly uniform, fine-cell structure consisting mainly of thin-walled, closed cells. The products made from the foam beads are flexible and tough. Finely divided solid materials, such as calcium silicate, zinc stearate, magnesium stearate, and the like, can advantageously be incorporated into the polymer or gel prior to expanding the same. These finely divided materials aid in controlling the size of the cells and are employed in amounts of from 0.01 to 10 percent by weight of the polymer.

This invention relates to expandable thermoplastic polymers, such as styrene or olefin polymer compositions and processes, and more particularly to expandable modified thermoplastic polymer compositions having dimensional stability and utilizing a blowing agent selected from, but not limited to, volatile organic compounds.

It is well known to prepare thermoplastic polymer foams by heat plastifying a normally solid thermoplastic polymer resin, admixing such heat plastified resin with a blowing agent under heat and pressure to form a flowable gel and thereafter extruding the gel into a zone of lower pressure and temperature to activate the blowing agent and expand and cool the gel to form the desired solid thermoplastic foam product.

However, a problem frequently encountered with some thermoplastic foams, especially polyolefins such as polyethylene, is that of preventing an unacceptable degree of shrinkage of partially cured foam during the aging or curing period following production of the foam. During the aging or curing period the blowing agent employed gradually diffuses out of the cells in the foam product and air gradually diffuses into the cells in place thereof. Until quite recently, it was believed that only one volatile hydrocarbon blowing agent, namely 1,2-dichlorotetrafluoroethane, was capable of providing sufficient dimensional stability during the curing period to permit the commercially viable manufacture of low density (e.g., 1 to 6 lbs/ft$^3$, or 16 to 96 kg/m$^3$) foams of ethylenic polymer resins. That is, only dichlorotetrafluoroethane was believed to diffuse out of the foam cells slowly enough to prevent cell wall collapse while air was slowly diffusing into the cells.

More recently, permeability modifiers or stability control agents have been developed for incorporation into polyolefins in an attempt to slow the diffusion of volatile hydrocarbon blowing agents out of polyolefin foam cells. The objective of these permeability modifiers is to render the foams more dimensionally stable to a wider variety of volatile hydrocarbon blowing agents. For purposes of this invention, the terms "permeability modifier" and "stability control agent" will be used interchangeably and will refer to compositions incorporated into the polyolefin to slow diffusion of volatile hydrocarbon blowing agents from the foam cell walls. For example, Watanabe et al, U.S. Pat. No. 4,214,054, teaches the production of polyolefin foams utilizing volatile hydrocarbon blowing agents. Permeability modifiers such as saturated higher fatty acid amides, saturated higher aliphatic amines, and esters of saturated higher fatty acids are incorporated into the polyolefin composition prior to expansion.

U.S. Pat. No. 4,331,779 also teaches ethylenic polymer foams having improved dimensional stability and teaches the use of a copolymer of ethylene and an unsaturated carboxylic acid as a stability control agent. U.S. Pat. No. 4,347,329 teaches the use of a fatty acid amide such as stearamide for use in polyolefin foams as a stability control agent. U.S. Pat. No. 4,394,510 further teaches the use of fatty acid amide stability modifier agents to produce polyolefin foams having improved elevated temperature dimensional stability. U.S. Pat. No. 3,644,230 discloses a method for preventing post extrusion cell collapse in polyolefin foams by the incorporation of a small amount of a partial ester of a long chain fatty acid and a polyol. U.S. Pat. No. 3,755,208 discloses a method for preventing post extrusion cell collapse in vinyl copolymer foams by the incorporation of a small amount of a partial ester of a long chain fatty acid and a polyol.

The use of such permeability modifiers permits the use of a wider variety of volatile blowing agents. The more inexpensive volatile blowing agents, such as isobutane, can be utilized in conjunction with stability control agents to stop shrinkage. When isobutane has been used alone as the blowing agent in polyolefin foams without the stability control agent, the foams exhibit maximum shrinkages defined as 100(1-r) of between 10 and 20%, where r=the ratio of the volume of foam on the day it is at a minimum to the volume of the foam immediately after expansion. See, i.e., Examples 21, 24, and 37 at Table 7 of Watanabe et al, U.S. Pat. No. 4,214,054.

Accordingly, the need exists in the art for low cost volatile blowing agents which can be used to expand olefin polymers and yet exhibit a high degree of dimensional stability with minimal shrinkage during aging or curing of the polymer foams.

In accordance with the present invention, moldable foam beads comprising a silane-modified, crosslinked polyolefin foam are produced by Method A, which comprises the steps of:

Method A (a) mixing a composition comprising a silane-modified polyolefin, a silanol condensation catalyst, and other desired additives in an extruder to produce a melt;

(b) injecting a blowing agent into the melt at a rate effective to produce the desired foam density in the extrudate;

(c) extruding the melt into a pressurized zone and cutting it to form crosslinkable non-foamed foamable polyolefin beads (the term "beads" is meant to denote particles of any configuration);

(d) exposing the crosslinkable foamable polyolefin beads to moisture to produce silane crosslinking of the foamable polyolefin beads;

(e) adjusting the temperature of the crosslinked foamable polyolefin beads to a suitable and effective foaming temperature; and (f) expelling the crosslinked foamable polyolefin beads to a zone of lower pressure that will cause them to expand and form foam beads.

In accordance with the present invention, moldable foam beads comprising a crosslinked polyolefin foam are also produced by Method B, which comprises the steps of:

Method B (a) mixing a composition comprising a polyolefin, a chemical crosslinking agent, and other desired additives in an extruder to produce a melt;

(b) injecting a blowing agent into the melt at a rate effective to produce the desired foam density in the extrudate;

(c) extruding the melt into a pressurized zone and cutting it to form crosslinkable, non-foamed, foamable polyolefin beads;

(d) exposing the crosslinkable foamable polyolefin beads to sufficient temperatures to produce crosslinking of the foamable polyolefin beads;

(e) adjusting the temperature of the crosslinked foamable polyolefin beads to a suitable and effective foaming temperature; and (f) expelling the crosslinked foamable polyolefin beads to a zone of lower pressure that will cause them to expand and form foam beads.

In accordance with the present invention, moldable foam beads comprising any foamable thermoplastic polymer may also be produced by method C, comprising the steps of:

Method C (a) mixing a composition comprising a thermoplastic polymer, such as polystyrene or polypropylene and other desired additives in an extruder to produce a melt;

(b) injecting a blowing agent into the melt at a rate effective to produce the desired foam density in the extrudate;

(c) extruding the melt into a pressurized zone and cutting it to form non-foamed foamable thermoplastic polymer beads.

(d) adjusting the temperature of the foamable thermoplastic polymer beads to a suitable and effective foaming temperature, and (e) expelling the foamable thermoplastic polymer beads to a zone of lower pressure that will cause them to expand and form foam beads.

In accordance with the present invention, moldable foam beads may also be produced by method D, comprising the steps of:

Method D (a) mixing a composition comprising:
  (1) a silane-modified polyolefin and a silanol condensation catalyst; or
  (2) a polyolefin and a chemical crosslinking agent; or
  (3) a non-crosslinked polymer; or
  (4) any combination of compositions (1)–(3); and any desired additives into an extruder to produce a melt;

(b) injecting a blowing agent into the melt at a rate effective to produce the desired foam density in the extrudate;

(c) pumping the melt into a flow channel where it may have, if desired, a lubricant between the polymer and the channel wall and where it is exposed to: (1) moisture to form a crosslinked non-foamed foamable polyolefin and/or; (2) a sufficient temperature to produce crosslinking of the foamable polyolefin and/or (3) a channel wall temperature that will adjust the polymer's temperature to make it more suitable for foaming;

(d) adjusting the temperature of the crosslinked foamable polyolefin as it flows through the flow channel to a suitable and effective foaming temperature;

(e) expelling the compositions of the polymers listed above in this paragraph through a die to a zone of lower pressure that will cause them to expand; and (f) cutting the expanded polymers to form foam beads.

Foamed components of a desired shape may be produced in accordance with the present invention by method E, comprising the steps of:

Method E (a) mixing a composition comprising:
  (1) a silane-modified polyolefin and a silanol condensation catalyst; or
  (2) a polyolefin and a chemical crosslinking agent; or
  (3) a non-crosslinked polymer; or
  (4) any combination of compositions (1)–(3); and any desired additives into an extruder to produce a melt;

(b) injecting a blowing agent into the melt at a rate effective to produce the desired foam density in the extrudate;

(c) pumping the melt into a flow channel, wherein the channel wall may be lubricated if desired;

(d) exposing the polymer within the channel wall to: (1) moisture to form a crosslinked, non-foamed foamable polyolefin and/or; (2) a sufficient temperature to produce crosslinking of the foamable polyolefin and/or (3) a channel wall temperature that will adjust the polymer's temperature to make it more suitable for foaming;

(d) adjusting the temperature of the crosslinked foamable polyolefin as it flows through the flow channel to a suitable and effective foaming temperature;

(e) expelling the foamable polymer through a die;

(f) cutting the polymer into beads;

(g) dispensing the beads into a mold where the pressure is:
  (1) high enough to prevent significant expansion of the polymer beads;
  (2) above ambient pressure and high enough to allow only partial expansion of the beads into a foam bead; or
  (3) at ambient pressure where complete expansion of the beads occurs;

(h) releasing the pressure, with or without the addition of heat by steam or other suitable means, after a sufficient amount of the beads or partially expanded foam beads are in the mold, to cause the foam beads to fuse together to form the component that resembles the shape of the mold; and (i) expelling the molded part, with or without first cooling the part in the mold.

The blowing agent used in the present invention can be selected from volatile hydrocarbons, halogenated hydrocarbons, and compressed, inert gases. Alternatively, instead of injecting such a blowing agent in step (b) of the Methods, a solid blowing agent can be mixed into the composition in step (a). As an alternative to the use of silane-modified polyolefins in Method A, step (a), such raw materials can be formed in situ as the ingredients are mixed and melted by mixing effective amounts of a composition comprising at least one polyolefin with a silane compound containing at least one unsaturated group, a free radical initiator and a silanol condensation catalyst in the extruder.

Still further in accordance with the invention, processes are provided for molding solid foam articles from moldable foam beads prepared in accordance with the above processes, by the application of heat and pressure in a mold.

Further aspects and advantages of the present invention will be apparent to those skilled in the art from the following detailed description and the appended claims.

DETAILED DESCRIPTION OF THE INVENTION

This invention relates to a method and apparatus for manufacturing thermoplastic polymer foam beads, such as polystyrene or polyolefin foam beads, and articles made therefrom having a composite structure made up, if desired, of an antistatic agent and a flame retardant agent which, when combined and produced in accordance with this invention, have improved usefulness because of their properties. The new thermoplastic polymer foam beads are produced in a single operation. Their costs are substantially less than those made by a coating process or the secondary lamination of articles made from the beads.

In accordance with the present invention, moldable thermoplastic polymer foam beads, such as expanded, crosslinked polyolefin foam beads, are produced using a conventional extruder apparatus having suitable means for heating and cooling, and with a blowing agent injected into the polymer melt or introduced into the solid form.

In Method A, crosslinking of the polyolefin resin is carried out after extrusion when the polyolefin is brought into contact with moisture. A silane-modified polyolefin resin is used, such as polyethylene modified to contain carbon-bonded silyl groups. This silated or silane-grafted resin is melt mixed in the extruder with the proper amount of a silanol condensation catalyst. A plastic product made in this manner will crosslink when contacted with water.

In making the novel beads of this invention, the silane-grafted polyolefin resin, the condensation catalyst, a nucleating agent such as talc for cell size control, and any other desired additives, are typically mixed with the resin before it is added to the hopper of an extruder. The ingredients are melted, mixed and forwarded through the extruder. At a point in the extruder where all of the ingredients are well mixed and fully melted, a blowing agent, preferably comprising a volatile organic compound, or an inert gas or a mixture thereof, is injected under pressure into the molten polymer mix. The blowing agent and polymer are sufficiently mixed and extruded through a die plate containing a number of small holes.

In Method B, chemical crosslinking of the polyolefin resin is carried out essentially after the polyolefin leaves the extruder, when the polyolefin is brought to a temperature that is suitable for activating the chemical crosslinking agent which then crosslinks the polyolefin.

In making the novel beads of this invention in Methods A and B, thermoplastic polymers, such as polyolefin resin, a crosslinking agent, talc or other nucleating agent for cell size control, and any other desired additives, typically are mixed with the resin before it is added to the hopper of an extruder. The ingredients are melted, mixed and forwarded through the extruder. At a point in the extruder where all of the ingredients are well mixed and fully melted, a blowing agent, preferably comprising a volatile organic compound or an inert gas or a mixture thereof, is injected under pressure into the molten polymer mix. The blowing agent and polymer are sufficiently mixed and extruded through a die plate containing a number of small holes.

The resultant foam strands produced by either Method A or B are cut as they emerge from the die into a pressure zone to form a substantially non-foamed foamable bead. The crosslinking of the polyolefin then commences with exposure to moisture as in the case of Method A or after sufficient heating, as in the case of Method B. Once the foamable polyolefin beads are sufficiently crosslinked, the temperature of the foamable polyolefin beads is adjusted to a suitable foaming temperature, and the crosslinked foamable beads are then expelled to a lower pressure where they expand to form crosslinked foamed beads. The beads are typically cooled after expansion, collected and conveyed to a suitable storage area, such as a bag or other suitable container, and are held until they are needed for the molding process.

In Method C, the thermoplastic polymer resin beads of this invention can be mixed with talc, or with another nucleating agent for cell size control, and with any other desired additives, which are mixed with the resin before it is added to the hopper of an extruder. The ingredients are melted, mixed and forwarded through the extruder. At a point in the extruder where all of the ingredients are well mixed and melted, a blowing agent, preferably comprising a volatile organic compound or an inert gas or a mixture thereof, is injected under pressure into the molten polymer mix. The blowing agent and polymer are sufficiently mixed and extruded through a die plate containing a number of small holes.

The resultant foam strands produced by Method C are cut as they emerge from the die into a pressure zone to form a substantially non-foamed, foamable bead. The temperature of the foamable thermoplastic polymer, beads is adjusted to obtain a suitable foaming temperature, and then the foamable beads are expelled to a lower pressure where they expand to form foamed beads. The beads are typically cooled after expansion, collected and conveyed to a suitable storage area, such as a bag or other suitable container, and held until they are needed for the molding process.

Using the process of the present invention, expanded thermoplastic polymers, such as polystyrene and non-crosslinked as well as crosslinked polyolefin foam beads having foamed bulk densities in the range of from about 0.7 to about 10 pounds per cubic foot, are produced. The beads preferably having foamed bulk densities in the range of from about 1.2 to about 5 pounds per cubic foot, and most preferably from about 1.5 to 2.5 pounds per cubic foot.

One of the primary raw materials presently preferred for the process in Method A, are the silane-grafted low density polyethylene resins. Processes for the production of such resins are described in U.S. Pat. Nos. 3,646,155, 4,117,195, and 4,526,930. Generally, a silane is grafted to the base low density polyethylene resin. The grafting is achieved by melt mixing, in an extruder or in another compound mixer such as a Brabender mixer, a free radical generator, such as dicumyl peroxide, and a silane, such as vinyltrimethoxysilane. The pendant silyl groups will form crosslinks between the polymer chains when the polymer is exposed to moisture in the presence of an organometallic silanol condensation catalyst (i.e., an organotin ester such as dibutyl tin dilaurate).

The catalyst may be combined with the polyethylene resin, silane, and free radical generator in a second step, in which the final moisture curable product is formed. The catalyst may also be combined with the polyethylene resin, silane, and free radical generator in one extrusion or mixing step, as in the Monosil process of The Swiss Maillefer Company. In the case of the two step process, Dow Corning's Sioplas (U.S. Pat. No. 3,646,155) process, silane grafted polyethylene resins and a catalyst master batch, a dispersion of the catalyst in polyethylene resin, can be readily purchased. These two products are then mixed in the proper proportions and processed as desired to form a moisture curable product. Silane-grafted polyethylene resins and catalysts are available from Synergistics Chemicals, Ltd. of Mississauga, Ontario, Canada, under the trade names Synecure 1019-A for the silane grafted resin and Synecure 1000-B for the catalyst master batch. The silane grafted resin and the catalyst master batch are also available from Union Carbide Chemical and Plastics Company, Inc. under the trade name SI-LINK™.

In another two-step process, a moisture-crosslinkable polyethylene such as a silane ethylene copolymer is mixed with a catalyst master batch. Such materials are marketed by BP Performance Polymers under the trademarks SLPE and MCA 360 for the silane ethylene copolymer and catalyst master batch, respectively, and are said to offer various advantages over the use of one-step silane processes, peroxide crosslinking processes or silane grafted low density polyethylene.

One of the primary raw materials presently preferred in the process in Method B, are low density polyethylene resins. Generally, a low density polyethylene resin is blended with a free radical generator crosslinking agent, such as dicumyl peroxide, and is then processed in an extruder where the base low density polyethylene resin and crosslinking agent are melt mixed.

Two of the primary raw materials preferred for the process in Method C are polypropylene and polystyrene resins. Polypropylene resins suitable for this invention are HIMONT's PF-814 and SD-632 which are high melt strength resin.

The final resin/additive mixture is fed into the hopper of an extruder. At a point in the extruder where the plastic components of the resin mixture are fully melted, the blowing agent is injected. The blowing agent used is typically a hydrocarbon, chlorofluorocarbon, hydrochlorofluorocarbon, or hydrofluoro-carbon such as isobutane, n-butane, isopentane, normal pentane, dichlorodifluoromethane, dichlorotetrafluoroethane, chlorodifluoromethane, or mixtures thereof. The blowing agent is injected at a rate effective to give the desired foam density, usually as about 5 to 70 weight percent of the total foam output rate, preferably 10 to 40, and the most preferably 25 to 40 weight percent of the total foam output rate. The proper temperature for foaming depends upon the melting point of the polymer and the type and amount of blowing agent used, but is generally in the range of from about 175° to about 340° F., and is preferably from about 190° to about 240° F. when ethylene polymers are used. Hydrocarbons and halogenated hydrocarbons which are at least partially soluble in the polyolefin resins used have a plasticizing effect on the melt, reducing the frictional heat generated. Furthermore, due to the latent heat of vaporization, these materials have a cooling effect during foaming as the blowing agent vaporizes. The foaming temperature should be maintained within the desired range by the use of external cooling means in conjunction with a rate of flow of the blowing agent effective to provide additional cooling effects.

In the extruder, the resin/additive/blowing agent mixture is mixed sufficiently and then extruded under pressure that is sufficient to prevent foaming of the extrudate. The extruder is equipped with a die with many small holes. The foamable mixture is extruded through these holes and cut by a rapidly rotating knife which cuts the extrudate into small beads. If a propeller-type knife is used, the holes on the die are arranged in a circle so that the extrudate will be cut as the knife rotates about its center axis. The rate at which the extrudate emerges from the die is easily controlled, and the size of the beads are determined by size of the holes on the die plate and the speed of the rotating knife.

As the beads are cut at the die face, they remain under sufficient pressure to prevent a significant amount of foaming. If the beads do not need to be crosslinked, they will go directly into an annealing zone. If the beads need to be crosslinked, they are then conveyed to a crosslinking zone. In Method A, the beads are suspended in a media, preferably heated water, as they are conveyed through the crosslinking zone. The crosslinking zone is sized to allow for sufficient time for the beads to achieve the desired level of crosslinking.

In Method B, the beads are suspended in a heated media, such as water or other suitable fluid, as they are conveyed through the crosslinking zone where the chemical crosslinking agent is activated by heat and crosslinks the polyolefin.

Again, the crosslinking zone is sized to allow for sufficient time for the beads to achieve the desired level of crosslinking.

If the beads do not need to be crosslinked, they pass directly into an annealing zone. If they need to be crosslinked, they are crosslinked to the desired level and then pass into an annealing zone. The beads remain suspended in the fluid media as they flow into a annealing zone where their temperature is adjusted to achieve the optimum foaming temperature for the beads. Some of the parameters that dictate the optimum foaming temperature are the rheology of base thermoplastic polymer/blowing agent admixture, the level of crosslinking, if applicable, and final foam density. In a foam extrusion process where an extruder is used to cool the thermoplastic polymer's melt temperature, there is usually a large temperature differential within the polymer melt. This occurs because the extruder's barrel temperature has to be cooler than the polymer's melt temperature to remove heat from it. In addition, the feed-screw is putting shear energy into the polymer which increases the polymer's melt temperature. Consequently, there are areas of cold and/or hot spots throughout the polymer melt creating a temperature differential. The temperature differential within the polymer melt effects the polymer expansion rate as well as the amount of expansion. In this invention, the annealing zone can achieve a very uniform melt temperature because it does not put shear heat energy into the beads, but rather removes it uniformly until the desired temperature is achieved. Once the beads are at the desired foaming temperature, they are expelled into a zone of lower pressure where they expand, cool and fall into a collection bin. The beads are then drawn out of the bin pneumatically or by other suitable means and are conveyed to a collection area, preferably a bag or other suitable container. The expanded beads remain in storage until they are needed for molding.

If thermoplastic polymer foam beads, such as polyolefin foam beads, are crosslinked, they should be crosslinked at least enough to make the foam beads thermally stable in the molding process. Higher proportions of crosslinking can be used to produce beads and molded objects having firmer textures. Generally, the percentage crosslinking or gel content should range from about 5 to about 85 percent, preferably from about 8 to about 60 percent as measured by ASTM D-2765.

The above described process for the manufacture of moldable thermoplastic polymer foam beads possesses has many advantages over other methods and processes used. The equipment used is relatively simple compared to that required for other processes. The primary equipment used is an extruder equipped with a blowing agent injection system. This type of extruder is well known to those with knowledge of thermoplastic manufacture. The machinery which converts the foam strands to beads is a simple cutter that is used for die face pelletizing of non-foamed thermoplastic polymers such as polyolefin. After the beads are cut, they are conveyed to a crosslinking apparatus or, if no crosslinking is required, they pass directly into an annealing tube or apparatus. The crosslinking apparatus can be another extruder or tube where the beads are kept under pressure and crosslinked as they are conveyed through it. After the crosslinking apparatus, the beads pass into and through an annealing device or temperature regulator apparatus. The annealing tube or apparatus can also be another extruder or tube where the beads can be kept under pressure as they are brought to the desired temperature as they are conveyed through the tube or apparatus.

Regardless of whether Method A or B is used to crosslink the polyolefin, the crosslinkable polyolefins are extruded in the same manner as a normal polyolefin. The methods of crosslinking disclosed in this invention eliminates the need for a high energy radiation source for crosslinking and will give more uniform crosslinking throughout the foam in comparison to the radiation method, as radiation does not easily penetrate relatively thick (⅛"–½") foam.

The beads made by this invention are non-crosslinked or crosslinked, as desired and are expanded as they leave the apparatus into a zone of lower pressure, which eliminates the need for large autoclave type reactors. The use of heat activated chemical crosslinking or silane crosslinking eliminates the need for a preprocessing crosslinking step. The beads made in this manner do not require the pre-molding pressurizing step used in the autoclave blowing agent impregnation process.

The entire system needed to make these moldable thermoplastic polymers, such as non-crosslinked and crosslinked polyolefin beads, can be installed at the molding facility and sized according to the molder's needs. Using the apparatus and method disclosed in this invention, the molder can produce the quantity of beads as needed to fill orders. Crosslinking, when required, takes place in the apparatus, and expansion occurs as the beads leave the apparatus. The storage time required, by some methods, to age the beads is eliminated or significantly less, and the space than that required for storing large volumes of expanded beads purchased from current suppliers is less. Having the bead manufacturing equipment at the molding site eliminates the high cost associated with shipping large quantities of the low bulk density beads. In addition, since the molder is producing his own beads, he has complete control over the moldable bead specifications, such as density, color, additives, crosslinked level, etc., and these can be changed relatively easily as needed.

In the production of the heat activated, chemically crosslinked polyolefin foams or silane-crosslinked polyolefin foams of the present invention where silane-modified polyolefins are used, polyolefins are selected from homopolymers and copolymers of ethylenically-unsaturated monomers having from 2 to about 8 carbon atoms, such as ethylene, propylene, butenes, pentenes, hexenes and the like. The copolymers can include other compatible monomers, as described below. Presently, the polyethylene-type polymers are preferred, and such polymers are referred to in the disclosure and examples below, but this should be regarded as exemplary of the invention rather than limiting in any sense. Particularly preferred are the polyethylenes, including medium density polyethylene, low density polyethylene, and linear low density polyethylene. Such polyethylenes are described in the Kirk-Othmer Encyclopedia of Chemical Technology, Third Ed., Vol. 16, pages 385–420, the Modern Plastics Encyclopedia 1986–87, pages 52–63 and in the Encyclopedia of Polymer Science and Technology, Vol. 7, page 610.

The term "silane-modified polyethylene resin", as used in the present specification and the appended claims, denotes a modified polyethylene resin obtained by chemically bonding a silane compound containing at least one unsaturated group to a polyethylene-type resin in the presence of a radical generator, as disclosed, for example, in U.S. Pat. No. 4,160,072.

The term "polyethylene resin", as used in the present specification and the appended claims, is meant to include not only homopolymers of ethylene, but also ethylene copolymers composed of at least 50 mole percent, and preferably at least 70 mole percent, of an ethylene unit and a minor proportion of a monomer copolymerizable with ethylene, and blends of at least 50 percent by weight, preferably at least 60 percent by weight, of the ethylene homopolymer or copolymer with another compatible polymer.

Examples of monomers copolymerizable with ethylene and other olefins, are vinyl acetate, vinyl chloride, propylene, butene, hexene, acrylic acid and its esters, and methacrylic acid and its esters. The other polymer that can be blended with the ethylene homopolymer or copolymer may be any polymer compatible with it. Some examples of compatible polymers include polypropylene, polybutadiene, polyisoprene, poly-chloroprene, chlorinated polyethylene, high density polyethylenes, polyvinyl chloride, a styrene/butadiene copolymer, a vinyl acetate/ethylene copolymer, an acrylonitrile/butadiene copolymer, a vinyl chloride/vinyl acetate copolymer, etc. Especially preferred species are polypropylene, polybutadiene and styrene/butadiene copolymer.

Examples of polyethylene resins that can be advantageously employed in the present invention are low-, medium-, and high-density polyethylenes, an ethylene/vinyl acetate copolymer, an ethylene/propylene copolymer, copolymers of ethylene and methyl or ethyl acrylate, a blend of polyethylene and polypropylene, a blend of polyethylene and ethylene/vinyl acetate copolymer, and a blend of polyethylene and an ethylene/propylene copolymer. Of these, a medium density polyethylene, low density polyethylene, and ethylene/propylene copolymers are especially suitable.

Preferably, the polyethylene resins have a softening point of less than 130° C. Furthermore, it is preferred that the polyethylene resin have a melt index of 0.2 to 20, preferably 0.3 to 6 decigrams per minute, and a density of 0.910 to 0.940, preferably 0.916 to 0.925 grams/cc.

In the present invention, the silane-modified polyolefin resin is prepared by chemically bonding a silane compound containing at least one unsaturated group to the polyolefin resin described above in the presence of a radical generator. The silane compounds used in this invention are organosilicon compounds containing at least one unsaturated group capable of being chemically bonded to the sites of free radicals generated in the polymer chain of the polyolefin as a result of radical reaction. Several examples of such compounds are described in U.S. Pat. No. 4,160,072, and typically include organosilane compounds of the following formula:

wherein one or two, preferably only one, of $R_1$, $R_2$, $R_3$ and $R_4$ represent a hydrocarbyl or hydrocarboxyl group containing a radical-polymerizable double bond, and the rest represent organic residues capable of being split off by hydrolysis.

In the above formula, examples of the hydrocarbyl group containing a radical-polymerizable double bond are vinyl, allyl, 2-methylallyl, butenyl, cyclohexenyl, cyclopentadienyl, and octadienyl, and examples of the hydrocarboxyl group containing a radical-polymerizable double bond include allyloxy and 2-methyl allyloxy. Other examples include:

Of these, vinyl is most preferred.

Examples of the organic residues capable of being split off by hydrolysis include alkoxy groups such as methoxy, ethoxy or butoxy; acyloxy groups such as formloxy, acetoxy or propionoxy; oxime groups such as:

—ON=C(Me)$_2$, —ON=C(Me) (Et), and —ON=C(C$_6$H$_5$)$_2$ and substituted amino groups, for example, alkyl amino or aryl amino groups such as methyl amino, ethyl amino or phenyl amino. Of these, the alkoxy groups are especially preferred.

The silane compound preferably contains three hydrolyzable organic groups. Suitable silanes include:

(1,2-epoxyethane) ethyltrimethoxy silane
(1,2-epoxyethane) propyltrimethoxy silane
(1,2-epoxyethane) ethyltriethoxy silane
(1,2-epoxyethane) propyltriethoxy silane
(1,2-epoxyethane) ethylmethyldimethoxy silane
(1,2-epoxyethane) propylmethyldimethoxy silane
(1,2-epoxyethane) ethyl-tris-(ethoxymethoxy) silane
(1,2-epoxyethane) propyl-tris-(ethoxymethoxy) silane
(1,2-epoxyethane) ethyltrimethoxy silane and the sulfur and nitrogen analogues of these specific compounds. Also suitable are compounds such as -(3,4-epoxycyclohexane) ethyltrimethoxy silane and the like. Vinyl trimethoxysilane and vinyltriethoxysilane can be most conveniently used in the present invention.

The amount of the silane compound is not critical and can be varied widely according, for example, to the type of polyolefin resin, the desired degree of modification, and the reaction conditions. Generally, its amount is from about 0.1 to about 50 parts by weight, preferably about 0.3 to about 30 parts by weight, and most preferably about 0.5 to about 10 parts by weight, per 100 parts by weight of the polyethylene resin.

Advantageously, radical generators used in the heat activated crosslinking reaction in Method B or the reaction between the polyolefin resin and the silane compound in Method A, are those which decompose upon heating and generate radicals. The radical generator acts as a reaction initiator at the time of chemically bonding the silane compound to the polyolefin resin. These radical generators generally have a half life of 6 minutes or less, preferably 3 minutes or less, and most preferably 1 minute or less, at the melt-kneading temperature of the polyolefin resin. Typical examples of such radical generators include, but are not limited to, organic peroxides such as benzoyl peroxide, dichlorobenzoyl peroxide, or lauroyl peroxide; organic peroxides such as t-butyl peracetate, t-butyl peroxy-2-ethyl hexanoate, or t-butyl peroxy isobutyrate, t-butyl peroxy benzoate, dicumyl peroxide, 2,5-dimethyl-2,5-di(t-butylperoxy)hexane, 2,5-dimethyl-2,5-di(t-butylperoxy) hexyne-3, di-t-butyl peroxide, 2,5-di (peroxybenzoate) hexyl-3 or 1,3-bis(t-butyl-peroxyisopropyl)benzene; and azo compounds such as azobisisobutyronitrile or dimethyl azodiisobutyrate. Dicumyl peroxide is presently most preferred.

In any situation, a specified radical generator is selected depending upon the temperature at which the polyolefin resin is reacted in Method B or the temperature at which the polyolefin resin is reacted with the silane compound in Method A. For example, when the reaction is to be carried out at about 190° C. to 200° C., dicumyl peroxide, which has a half life of about 15 seconds at this temperature, is suitable. When the reaction is to be carried out at about 150° C., benzoyl peroxide, having a preferred half life at this temperature, is suitable. The amount of the radical generator is not limited in particular, and can be varied over a wide range according, for example, to the type of the polyolefin resin used or the amount of the silane compound. Although the radical generator should be used in an amount sufficient for performing the desired degree of modification, it should not be used in amounts such that the ordinary crosslinking of the polyolefin resin becomes a main reaction mechanism. Generally, its suitable amount is 0.01 to 1.5 parts by weight, preferably 0.1 to 1 part by weight, per 100 parts by weight of the polyolefin resin.

The bonding of the silane compound to the polyolefin resin can be performed easily by the method to be described herein below.

For example, the polyolefin resin, the radical generator, and the silane compound are fed into an extruder, and the radical generator is decomposed while melting the polyethylene resin, thereby chemically bonding the silane compound to the polyethylene resin. All silanol condensation catalysts which are usually employed to form a crosslinkage in silane-modified polyolefin resins are feasible as the silanol condensation catalyst in this invention. Examples of the silanol condensation catalyst are organometallic compounds such as organotin compounds [e.g., esters such as dibutyltin dilaurate, stannous acetate, and stannous octanoate or stannous caprylate), lead naphthenate, zinc caprylate, iron 2-ethylhexanoate, cobalt naphthenate, and titanic acid esters and titanium chelate compounds e.g., tetrabutyl titanate, tetranonyl titanate or bis(acetylacetonitrile)diisopropyl titanate]; organic bases such as ethylamine, hexylamine, dibutylamine or pyridine; acids such as inorganic acids (e.g., hydrochloric acid and phosphoric acid) and fatty acids (e.g., stearic acid, linoleic acid and octylic acid), and their metal salts. These catalyst compounds can be used either alone or as mixtures. Zinc salts of higher carboxylic acids can be used, such as zinc salts of aliphatic or alicyclic carboxylic acids containing 8 to 20 carbon atoms, preferably 8 to 17 carbon atoms. Examples of these zinc salts include zinc stearate, zinc octanoate, zinc laurate, and zinc naphthenate, with zinc stearate preferred. These higher carboxylic acid zinc salts may be mixed with a minor amount of another silanol condensation catalyst of the above-exemplified species, for example, organotin compounds, such as dibutyltin dilaurate, dibutyltin maleate or dibutyltin diacetate. The amount of the other silanol catalyst in the mixture should be minimized, and preferably limited to not more than 5 percent based on the total weight of the mixed silanol catalyst.

The amount of the silanol condensation catalyst can be varied according to the type and amount of the silane compound bonded to the modified polyolefin resin. Generally, its amount is at least about 0.01 parts by weight, preferably 0.1 to 20 parts by weight, and most preferably 0.5 to 10 parts by weight, per 100 parts by weight of the silane-modified polyolefin resin.

Another variation of Method B is achieved by combining a polyolefin resin, a photo-chemical crosslinking agent, and a catalyst. The blend is melted in the extruder and mixed with a blowing agent into a molten admixture, extruded under pressure and cut into beads, conveyed through a photo-crosslinking apparatus to produce crosslinking of the foamable polyolefin beads, then conveyed into an apparatus to adjust the temperature of the crosslinked foamable polyolefin beads to a suitable and effective foaming temperature, and finally expelling the crosslinked foamable polyolefin beads to a zone of lower pressure that will cause them to expand and form foam beads.

Of course, the above polymers mentioned can be used as non-crosslinked polymers. Any other non-crosslinked or crosslinked thermoplastic polymer that is foamable can be used in the present invention to make a moldable foam bead, including non-crosslinked polyolefins.

Blowing agents used in the process to manufacture the thermoplastic polymer foam beads are normally gaseous elements, compounds or mixtures thereof. Some of the blowing agents that can be used are listed below. These blowing agents listed are examples and are not meant to be construed as limiting this invention to only the blowing agent mentioned.

Among the elemental gases that may be employed with satisfactory results are nitrogen, argon, neon, and helium. In addition, normally gaseous organic compounds may be used to expand plastic material. Among the most important of these are the halogen derivatives of methane and ethane, which are used as refrigerants and for similar purposes, such as Trichlorofluoromethane(CFC-b 11), dichlorodifluoromethane(CFC-12), dichlorotetrafluoroethane(CFC-114), difluorotetrachloroethane(CFC-122), chlorodifluoromethane(HCFC-22), 1,1-dichloro 2,2,2-trifluoroethane (HCFC-123), 1-chloro-1,2,2,2 tetrafluoroethane (HCFC-124), 1,1,2,2,2,-pentafluoroethane (HCFC-125), 1,2,2, 2, -tetrafluoroethane (HFC-134a), 1,1-dichloro 1-monofluoroethane (HCFC-141b), 1,-chloro-1,1,-difluoroethane (HCFC-142b), 1,1,-difluoroethane (HFC-152a), ethyl chloride, methyl bromide, methyl chloride and the like, and mixtures of any two or more of the above.

Other normally gaseous compounds that may be employed are acetylene, ammonia, butadiene, butane, butene, carbon dioxide, nitrous oxide, cyclopropane, dimethylamine, 2-2-dimethyl propane, ethane, ethylene, isobutane, isobutylene, methane, monomethylamine, propane, propylene and trimethylamine and the like, and mixtures of any two or more of the above blowing agents.

All of the aforementioned materials are intended to be embraced within the term "normally gaseous, expanding medium" as used herein. This term is intended to mean that the expanding medium employed is a gas at the temperatures existing under the normal operating conditions of a plastic extruder. Also, when reference is made to the introduction of a normally gaseous, expanding medium or a gas into a plastic compound in an extrusion cylinder, it is to be understood that, while the material introduced is a gas at the normal operating temperatures of the extruder, it may be in either gaseous or liquid state at the temperature and pressure at which it is introduced into the extrusion cylinder. It is advantageous to employ blowing agents which are liquids when introduced into the extrusion cylinder because it is easier to pump a liquid under constant pressure and volume than it is to supply a gas under constant pressure and volume.

Examples of liquids which may be used as blowing agents include hydrocarbons, such as isopentane, pentane, hexane, heptane or octane; unsaturated hydrocarbons, such as pentene, 4-methyl pentene, hexene or petroleum ester fractions; ethers, such as diethyl ether; alcohols, such as methanol or ethanol; ketones, such as acetone or methyl ethyl ketone; and halogenated hydrocarbons, such as carbon tetrachloride, chloroform, ethylene dichloride, methylene chloride, or 1,1,2-trichloro-1,2,2-trifluoroethane.

Other blowing agents that can be used are the chemical blowing agents that decompose at elevated temperatures to liberate gases. These blowing agents include: azodicarbonamide, p-toluene sulfonyl hydrazide, dinitrosopentamethylene, mixtures of sodium bicarbonate and citric acid, gypsum, various hydrated aluminas such as aluminum trihydrate, sodium borohydrate and the like.

Blowing agents are usually incorporated in amounts from about 0.05 to about 55 percent by weight based on the polymer and can include a combination of two or more of the aforementioned blowing agents or the like or any other suitable compound and should not be construed as limited by the blowing agents listed. Other ingredients, such as fillers, antioxidants, antistatic agents, flame retardant additives, nucleation agents, lubricants, foaming aids, coloring agents, and deterioration inhibitors and the like may also be present in the polymer gel. Foamable compositions of thermoplastic polymer resins such as polyolefins or their copolymers, blowing agents, and additives are well known in the art, and representative samples of such compositions are set forth in the previously mentioned patents, the teachings of which are incorporated herein by reference.

Foamable compositions of thermoplastic polymers, such as polyolefins or their copolymers, blowing agents and additives, e.g., stability control agents, antistatic agents, flame retardant agents and the like, are well known in the art, and a representative sample of such compositions is set forth in the previously mentioned patents, the teachings of which are incorporated herein by reference.

Stability control agents are normally added to many polyolefin foams to prevent collapsing of the foam. Stability control agents suitable for use in the present invention include the partial esters of long-chain fatty acids with polyols described in U.S. Pat. No. 3,644,230, as well as higher alkyl amines, fatty acid amides and complete esters of higher fatty acids such as those described in Watanabe et al., U.S. Pat. No. 4,214,054. Typically, such stability control agents are employed in an amount ranging from about 0.1 to about 10 parts per hundred based on the weight of the olefin polymer employed.

Antistatic agents are normally added and mixed into the polyolefin resin prior to extrusion but the process described herein is not limited to this method. Examples of antistatic agents include, but are not limited to, the following: anionic surfactants such as alkyl sulfates, alkyl sulfonates, alkyl benzene sulfonates, sulfosuccinates, and esters of aliphatic alcohols and phosphoric acid and phosphates; cationic surfactants such as primary amine salts, secondary amine salts, tertiary amine salts, quaternary ammonium compounds and pyridine derivatives, and nonionic surfactants such as alkylene oxide adducts of aliphatic alcohols, alkylene oxide adducts of a fatty acid, alkylene oxide adducts of alkylphenol and alkyl naphthol, alkylene oxide adducts of polyhydric alcohols, alkylene oxide adducts of aliphatic amines and aliphatic amides, polyethylene glycol, and block copolymers of polyethylene glycol and polypropylene glycol. Nonionic-anionic surfactants such as mono and diesters of polyoxyethylene alkyl ethers and polyoxyethylene alkyl ether sulfates and polyoxyethylene alkyl phenol ether sulfates are suitable, as are amphoteric surfactants such as alkyl betaene and imidazoline derivatives. Other suitable antistatic agents maybe known by those skilled in the art. One or more of these or other antistatic agents are added in a quantity of 0.05 to 10 parts, preferably 0.2 to 3 parts, per 100 parts of polyolefin. If the antistatic agent is added in a smaller quantity, little or no effect of improving the antistatic properties of the polyolefin resin composition can be obtained. On the other hand, a greater quantity of the antistatic agent is undesirable since not only is the processability of the composition adversely affected, but also the mechanical properties of the composition deteriorates because of the adhesion of dust and dirt onto the surface of a shaped resin article due to bleeding of the antistatic agent, or because of the increased hygroscopicity of many antistatic agents.

Flame retardant additives are generally added and mixed into the thermoplastic polymer, such as polyolefin resin prior to extrusion, but the process described is not limited to this method. Examples of suitable flame retardant additives include halogen containing organic bromine and chlorine compounds preferably containing at least 50 percent by weight of bromine or chlorine. A suitable compound is chloroparaffin. Examples of the preferred bromine compounds include: 1,2,5,6,9,10-hexabromocyclododecane; tetrabromodibenzylacetone; pentabromophenylallylether; pentabromomonochlorocyclohexane; 1,1,2,3,4,4,-hexabromobutene-2,2,5-bis(tribromomethyl)-1,2,3-thiadrazol; 2,4,6-tris(tribromoethyl)-1,3,5-triazine; tetrabromoethane; bromotrichloromethane; 1,2,5,6-tetrabromohexane; hexabromobenzene; pentabromophenol; pentabromodiphenylether; tris-(dibromopropyl)phosphate; octabromocyclohexadecane; octabromodiphenol oxide; 2,4,6-tribromophenol; decabromodiphenyloxide; bis (tribromophenoxy) ethylene; and bromonaphthalene. These and other flame retardants are often used in admixture with antimony trioxide or antimony pentoxide to obtain a synergistic effect.

The molding of these thermoplastic polymer beads can be performed in several ways. The beads can be fed to a mold with at least one movable side which can compress the beads where they are subjected to a heat source, such as pressurized steam. Once the thermoplastic polymer comprising the beads is softened enough that it will fuse with itself, the compressible wall (walls) of the mold moves to compress the beads together, causing the beads to fuse and to conform to the shape of the mold.

Using a similar method, the beads are placed in a container adjacent to the mold and this container is pressurized with a compressed gas, such as air, causing the volume of the beads to decrease. The beads are then transferred in this compressed state to the mold, which is also pressurized to generally the same pressure. The mold containing these compressed polyolefin beads is closed and injected with pressurized steam to heat the beads to the temperature where the polyolefin will fuse. The pressure is released from the mold and the beads re-expanded back to their equilibrium volume. As the fusible beads re-expand, they fuse into one part with very little void space within.

In another method, known as the "crush-fill" method, beads are used to fill a mold, then compressed into the molding spaces as by movement of at least one wall of the mold, and steam is injected at a suitable pressure for a time sufficient to soften and fuse the beads. Steam pressures ranging from about 5 to 60 psig can be used and maintained for times ranging from about 1 to 15 seconds. Upon release of both physical and steam pressure, the beads are molded into a fused foam object in the desired shape. The use of steam in these molding methods facilitates the fusing of the foam beads.

Once the molded objects are removed from the mold and cooled, their properties can optionally be improved by annealing, i.e., heating in an oven for an effective period of time at an effective temperature to stabilize the size and shape of the molded objects. Generally, if there has been shrinkage of the molded parts, the parts will expand slightly during annealing so as to restore the part's proper size and shape, while at the same time reducing the density of the molded foam. Temperatures ranging from about 100° to about 200° F., preferably from about 140° to about 180° F., can be used. Depending upon the temperature used and the amount of annealing required, annealing times ranging from about 2 to about 48 hours, preferably from about 4 to about 24 hours, can be employed.

A great advantage of this process for the manufacture of moldable thermoplastic polymer foam beads, such as crosslinked polyolefin foam beads, is that commercially available raw materials and relatively simple and inexpensive equipment are utilized. In this respect, a small crosslinked polyolefin foam bead facility may be set up at the molding site, thereby eliminating the high cost of shipping the bulking foam beads. Another advantage is that the molder need manufacture only as much material for molding as presently required, eliminating the larger storage areas typically required for the storage of large bulk shipments. The molder may manufacture the beads to the specifications required as needed, such as level of crosslinking, density, color, etc. This process does not require the use of an autoclave-type pressure reactor for the manufacture of moldable polyolefins, nor does it utilize a pre-molding pressurizing step to impart expandability to the beads. This process does not require the use of a high-energy radiation source for the crosslinking. The degree of crosslinking throughout the beads will be more consistent using a heat activated crosslinking agent in the polyolefin or silane crosslinkages as the crosslinking sites are well dispersed throughout the polyolefin in the extruder while, with the use of radiation crosslinking, the effect tends to penetrate just slightly below the surface and not throughout the whole foam particle. The use of high energy radiation, such as electron beams or X-rays, also requires certain safety precautions to be observed, which makes this method of crosslinking disadvantageous.

Figure 1:
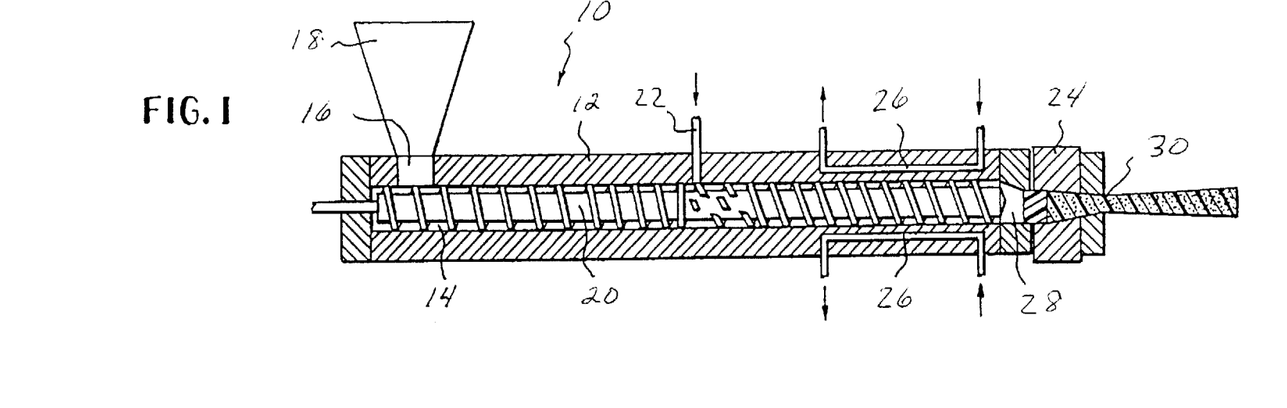
FIG. 1 is a schematic drawing of a conventional foam extruder and die.

The extruders suitable for use with the methods of the present invention can best be understood by first referring to FIG. 1, which shows a conventional foam extruder 10 known to the prior art. The extruder has a barrel 12 equipped with a central primary flow passage 14. An entrance 16 equipped with a hopper 18 is provided at one end of the extruder to facilitate introduction of materials into the primary flow passage. The barrel is generally heated to a temperature sufficient to melt the material being extruded, and the molten extrudate is forced through the primary flow passage by means of a feedscrew 20. An injection port 22 is provided for introducing a blowing agent into the molten mixture.

The barrel terminates in a die 24 which determines the shape or form of the extrudate. One or more cooling passages 26 are provided in the vicinity of the die, each having an inlet and an outlet. A suitable fluid, which is preferably maintained at a predetermined temperature, is passed continuously through the cooling passages to cool the molten mixture before it is extruded. The feedscrew forces the cooled molten mixture through an inlet passage 28 and into the die, where it exits the die orifice 30 as a foam.

Figure 2:
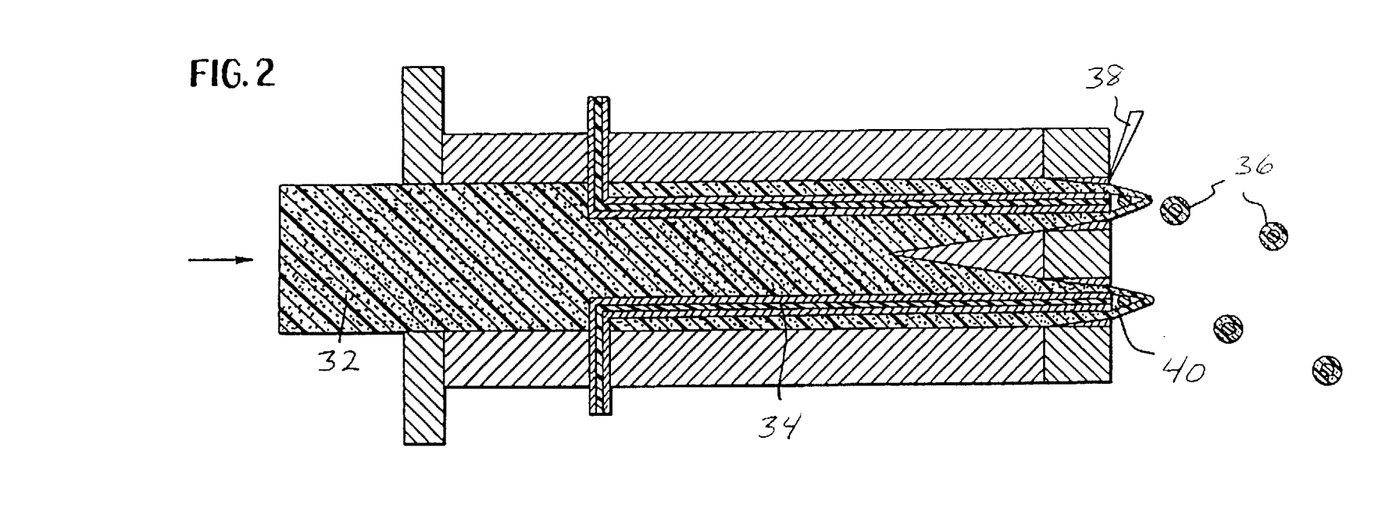
FIG. 2 is a schematic drawing of a first embodiment of an extruder die suitable for use with the method of the present invention.
Figure 3:
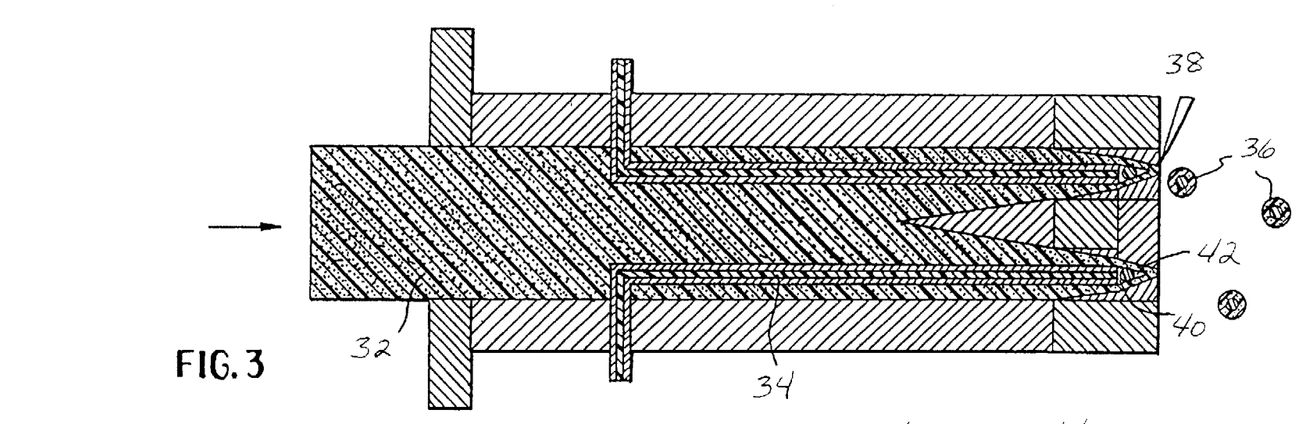
FIG. 3 is a schematic drawing of a second embodiment of an extruder die suitable for use with the method of the present invention.

FIGS. 2 and 3 show the extruder dies suitable for use with methods A–C of the present invention. These extruder dies are similar in most respects to that shown in FIG. 1. However, in addition to a central primary flow channel 32, the extruder dies of FIGS. 2–3 are further provided with a secondary flow channel 34 which can accommodate any secondary material capable of flowing at the normal extrusion temperatures of the thermoplastic. Such secondary materials have been previously discussed and may include any material that can enhance the properties of the extrudate. One example of such a material is "Aero-Gel", which has excellent insulation properties.

The thermoplastic and secondary material are cut and sealed into an encapsulated bead 36 by a knife or other cutting means 38. The point at which the thermoplastic and secondary material meet may be varied to achieve a desired result. Thus, in FIG. 2, the plastic and secondary material meet at the die orifice 40 where they are combined as they are passing through the cutting means. In FIG. 3, however, the plastic and secondary material meet at the interchange 42 within the primary flow channel where they are combined before passing through the cutting means.

If Method A is used, the silane grafted polyolefin and catalyst along with any other necessary or desired additive are dry blended and then conveyed to the hopper, where they are gravity fed into the primary flow channel. If method B is used, the polyolefin resin and chemical crosslinking agent, along with any other necessary or desired additive, are dry blended and then conveyed to the hopper.

Inside the extruder, the blended material is conveyed through the primary flow channel by means of a feedscrew. The extruder is equipped with heating means so that, as the blend is being pushed through the primary flow channel by the feed screw, it begins to melt. At a certain point along the primary flow channel, the plastic components of the blend become fully melted, at which point the blowing agent is injected into the blend. The resin/additive/blowing agent admixture is continuously mixed as it is conveyed through the extruder, until it reaches the point at which it is extruded.

Figure 4:
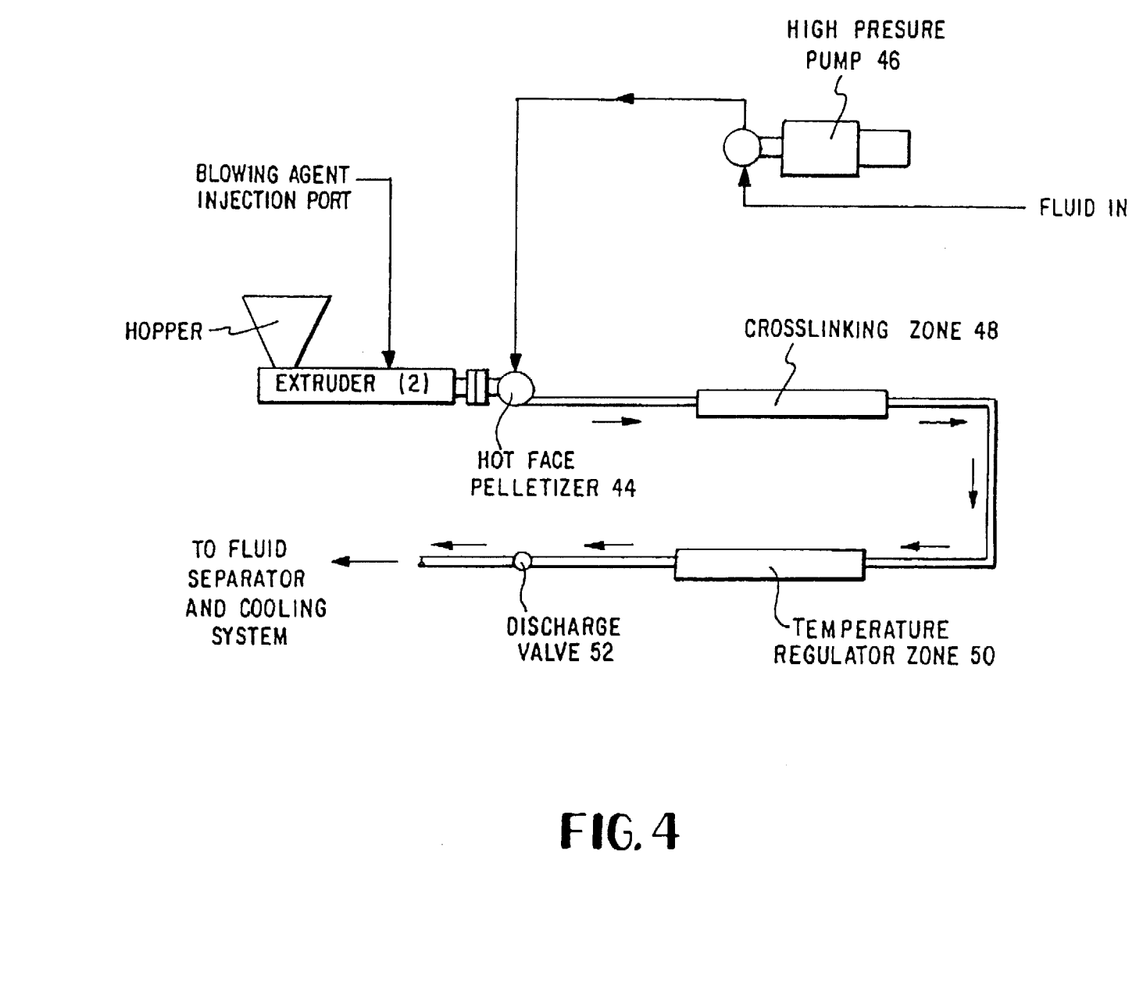
FIG. 4 is a schematic drawing of the extruder assembly used to implement the methods of the present invention.

FIG. 4 shows schematically the general outlay of the extrusion and treatment apparatus used with Methods A–C of the present invention. The extruder is equipped with a pelletizer 44 which is provided with a high pressure pump 46. The high pressure pump supplies a temperature controlled fluid, such as water or oil, to the cutting chamber of the pelletizer, and allows the admixture to be extruded under a pressure that is sufficient to prevent foaming of the extrudate.

The pelletizer has a die face with many small holes. The foamable admixture is extruded through these holes and cut by a rapidly rotating knife or other cutting means which cuts the extrudate into small beads. If a cylindrical rotor containing one or more blades is used, the holes on the die are arranged in a straight line so that they can be cut by the rotor at its closest point to the die. If a propeller-type knife is used, the holes on the die are arranged in a circle so that the extrudate will be cut as the knife rotates about its center axis. Because the rate at which the foam emerges from the die is not easily controlled, the size of the beads is determined by size of the holes on the die plate and the speed of the rotating knife.

Referring again to FIG. 4, the beads are maintained under a sufficient pressure to prevent foaming while they are cut at the die face and until they are expelled from the apparatus. If the thermoplastic polymer beads require crosslinking after they leave the cutting chamber of the pelletizer, as in Methods A and B, they are first suspended in a suitable heated media such as water and are passed through a crosslinking zone 48. The crosslinking zone is sized to allow for sufficient time for the beads to achieve the desired level of crosslinking. Once the beads have been crosslinked to the desired level, they are passed in the fluid media into an annealing or temperature regulator zone 50. Parameters such as the rheology of the thermoplastic polymer/blowing agent admixture or its rheology after crosslinking, if required, and final foam density dictate the optimum foaming temperature.

If the thermoplastic polymer beads do not require crosslinking, then Method C is used and the beads are passed directly into the annealing or temperature regulator zone where the temperature of the beads is adjusted to achieve the optimum foaming temperature.

Once the beads are at the desired foaming temperature, they are expelled through discharge valve 52 into a zone of lower pressure where they undergo expansion. A water separator and cooling system is used to cool and dry the beads. The beads are then collected in a bin where they can be drawn out pneumatically or by other suitable means and conveyed to a collection means, preferably a bag or some other suitable container. The expanded beads remain in storage until they are needed for molding.

Figure 5:
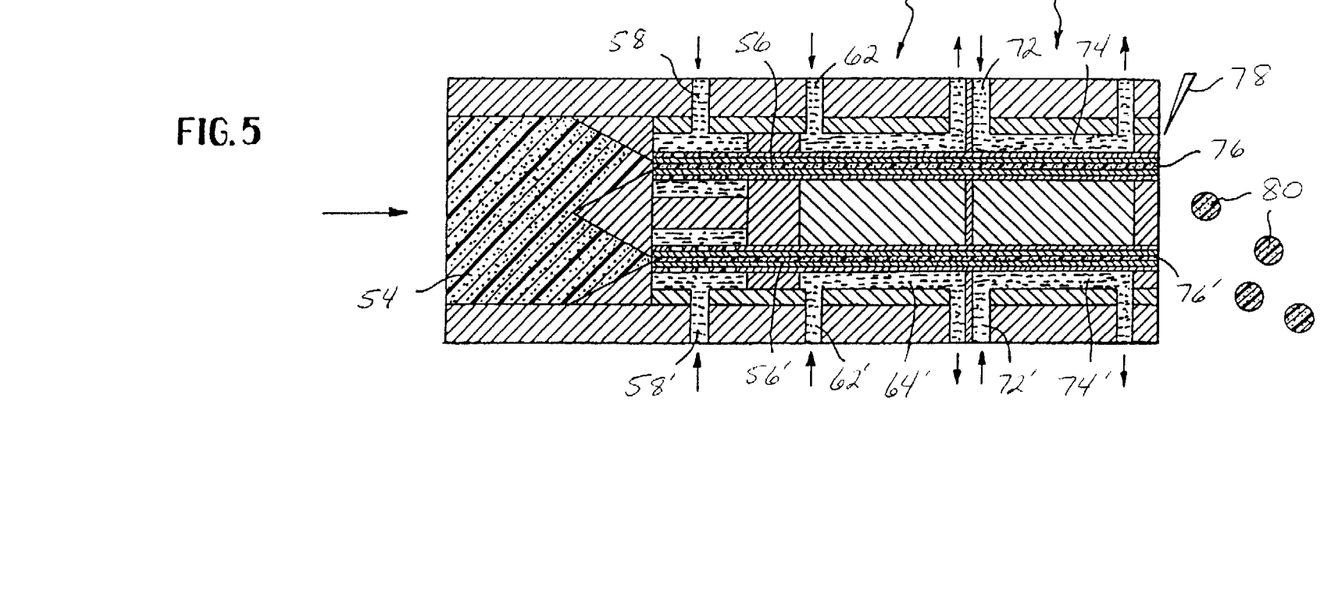
FIG. 5 is a schematic drawing of a third embodiment of an extruder die suitable for use with the method of the present invention.

FIG. 5 shows a die usable with Method D. The die is composed of a primary flow channel 54 and secondary flow channels 56, 56'. The crosslinking zones and annealing zones are both incorporated into the secondary flow channels, so that the molten polymer is crosslinked and its temperature is modulated before it exits the die and is cut.

Plastic flows from an extruder into the primary flow channel, and then forward into the secondary flow channels. At or near the area where the molten plastic enters the secondary flow channel, a lubricant fluid, such as water or another suitable lubricant, can be injected into the secondary flow channel by means of first injection ports 58, 58'. The lubricant fluid forms a fluid film between the molten plastic and the surface of the secondary flow channel. As molten plastic flows through the secondary flow channel, it passes into a first temperature modulation zone 60 where its temperature is modulated by a heat transfer fluid that is injected through second injection ports 62, 62' and flows through first die passages 64, 64'. The first temperature modulation zone can either promote crosslinking in the molten plastic or enhance its foaming abilities.

As the molten plastic progresses through the die past the first temperature modulation zone, it enters a second temperature modulation zone 66 where its temperature is modulated by a heat transfer fluid that is injected through third injection ports 72, 72' and flows through second die passages 74, 74'. The temperature of the second temperature modulation zone modulates the temperature of the molten plastic to make it more effective at foaming.

Once the molten plastic is at the desired temperature, it is extruded through the die orifice 76, 76' and into a zone of lower pressure, which may be ambient pressure, where it is cut into pellets by a knife 78 and expands into foam beads 80. The length of the first and second temperature modulation zones can be varied to achieve a desired effect, taking into account such factors as the type of polymer used, the polymer flow rate, the amount of crosslinking desired, the cross-sectional dimensions of the secondary flow channel, the amount of heat that must be transferred to, or taken from the polymer, and other such considerations.

If the thermoplastic polymer is a material, such as a polyolefin foam, that requires crosslinking, the material should be crosslinked at least enough to make the foam beads thermally stable in the molding process. Higher proportions of crosslinking can be used to produce beads and molded objects having firmer textures. Generally, the percentage crosslinking or gel content should range from about 5 to about 85 percent, preferably from about 8 to about 60 percent, as measured by ASTM D-2765.

EXAMPLES

The following Examples serve to give specific illustrations of the practice of this invention but they are not intended n any way to act to limit the scope of this invention. The numbered examples represent the present invention.

The following designations used in the examples and elsewhere in the present application have the following meanings:

| ABBREVIATION | DEFINITION |
|---|---|
| pcf | pounds per cubic foot |
| rpm | revolutions per minute |
| °F. | temperature (Fahrenheit) |
| dg/min. | melt index, decigrams per minute |
| g/cc | density, grams per cubic centimeter |
| L/D | length to diameter ratio |
| " | inches |
| psig | pounds per square inch, gage |
| g, gm | grams |
| hrs. | hours |
| min. | minutes |

EXAMPLE 1

As a specific example of materials suitable for the practice of the present invention, a Union Carbide grafted crosslinkable polyethylene resin no. DFDA-1596 which has a melt index of 1.5 dg/min. and a density of 0.920 gm/cc, is blended with a Union Carbide catalyst masterbatch polyethylene resin no. DFDA-1173 NT which has a melt index of 2.0 dg/min. and a density of 0.920 gm/cc and a Union Carbide low density polyethylene resin no. DNDA 4140 which has a melt index of 2.0 dg/min. and a density of 0.920 gm/cc at a ratio of 40 parts by weight of the DFDA-1596, 3 parts by weight of the DFDA-1173 NT, and 57 parts by weight of the DFDA-4140. The resin blend is further blended with mono- and di-glyceride, a stability control agent sold by Witco under the trade name of Atmos 150, at 1.4 parts by weight per hundred parts by weight of resin. The blend is fed into the hopper of the extruder. The blowing agent comprising of isobutane is fed into the extruder through the blowing agent injection port at a concentration of approximately 12 parts per 100 parts of the resin blend. The temperature in the zone of the extruder just prior to the point of entry of the blowing agent may be maintained at about 150° C. The molten polymer and blowing agent are thoroughly mixed and the molten admixture is forwarded through the pelletizer having a die with round holes of the desired size of the extrudate bead diameter. The extrudate is cut immediately at the die face by rapidly rotating rotor blades. The size of the cut beads depends upon the speed of the cutter and upon the speed with which the extrudate is coming from the die. By changing the speed of the cutter, the size of the beads can be regulated. The extrudate beads are kept under sufficient pressure to prevent appreciable expansion of the beads by the blowing agent which is dissolved or encapsulated in them and the beads are suspended in water to form a slurry. The beads/water slurry move through a crosslinking zone where the water temperature is heated. By the time the beads reach the end of crosslinking zone they are sufficiently crosslinked to achieve improved properties of the beads once they are expanded.

The crosslinked beads then pass through a temperature regulator zone where the temperature of the beads is regulated to the proper foaming temperature (about 210° F.). The beads are then expelled through a rotary type valve into ambient pressure and temperature. The sudden release of pressure causes the beads to expand. Once expanded the beads are cooled, dried, and collected in a container. The foam must be crosslinked before foaming to enhance its foamed properties and so that it does not collapse when exposed to pressurized steam during molding. Several suppliers of the moisture curable, silane-crosslinked polyethylene compounds have been found and these products are manufactured using the technology described in U.S. Pat. No. 3,646,166.

The crosslinked polyethylene beads produced have a diameter of 0.25" and a density of approximately 2.0 pcf. Beads of smaller diameters can be produced through the use of smaller holes and faster cutter speed.

EXAMPLE 2

The following is another example of materials suitable for the practice of the present invention. A mixture of 100 parts by weight of polyethylene resin having a melt index of 2.0 dg/min. and a density of 0.920 gm/cc, 1.5 parts of a zinc stearate activator, 1.0 parts of dicumyl peroxide, and 1.4 parts of Atmos 150 per 100 parts of resin, is preblended and fed into the hopper of the extruder. The blowing agent, which comprises isobutane, is fed into the extruder through the blowing agent injection port at a concentration of approximately 12 parts per 100 parts of polyethylene. The temperature in the zone of the extruder just prior to the point of entry of the blowing agent may be maintained at about 150° C. The molten polymer and blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry moves through a crosslinking zone where the water is heated. By the time the beads reached the end of crosslinking zone they are sufficiently crosslinked to achieve improved properties of the beads once they are expanded.

The crosslinked beads then pass through a temperature regulator zone where the beads' temperature is regulated to the proper foaming temperature (about 210° F.) and they are expelled through a rotary type valve into ambient pressure and temperature. The sudden release of pressure causes the beads to expand. Once expanded the beads are cooled, dried, and collected in a container.

The crosslinked polyethylene beads produced have a diameter of 0.25" and a density of approximately 2.0 pcf. Beads of smaller diameters can be produced through the use of smaller holes and faster cutter speed.

EXAMPLE 3

As another example of materials suitable for the practice of the present invention, 100 parts by weight of the blend of DFDA-1596, DFDA-1173 NT, and DFDA-4140 in Example 1 is preblended with 1.4 parts by weight of Atmos 150, and 16 parts by weight of resin of a heat activated chemical blowing agent. The blend is fed into the hopper of the extruder. The molten polymer and heat activated blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them and the beads are suspended in water to form a slurry. The beads/water slurry move through a crosslinking zone where the water is heated. By the time the beads reach the end of crosslinking zone they are sufficiently crosslinked to achieve improved properties of the beads once they are expanded.

The crosslinked beads then pass through a temperature regulator zone where the temperature of the beads is regulated to the proper foaming temperature (about 210° F.) and they are expelled through a rotary type valve into ambient pressure and temperature. The sudden release of pressure causes the beads to expand. Once expanded, the beads are cooled, dried, and collected in a container.

The crosslinked polyethylene beads produced have a diameter of 0.25" and a density of approximately 2.0 pcf. Beads of smaller diameters can be produced through the use of smaller holes and faster cutter speeds.

EXAMPLE 4

As yet another example of materials suitable for the practice of the present inventions, 100 parts by weight of the polyethylene resin in Example 2 is preblended with an 1.5 parts of an activator, 1.0 parts of dicumyl peroxide and 16 parts of a heat activated chemical blowing agent, and the mixture is fed into the hopper of the extruder. The molten polymer and blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry move through a crosslinking zone where the water is heated. By the time the beads reach the end of crosslinking zone they are sufficiently crosslinked to achieve improved properties of the beads once they are expanded.

The crosslinked beads then pass through a temperature regulator zone where the temperature of the beads is regulated to the proper foaming temperature (about 210° F.) and they are expelled through a rotary type valve into ambient pressure and temperature. The sudden release of pressure causes the beads to expand. Once expanded the beads are cooled, dried, and collected in a container.

The crosslinked polyethylene beads produced have a diameter of 0.25" and a density of approximately 2.0 pcf. Beads of smaller diameters can be produced through the use of smaller holes and faster cutter speeds.

EXAMPLE 5

As still another example of materials suitable for the practice of the present invention, 100 parts by weight of polypropylene resin produced by HIMONT and designated SD-632 is preblended with 0.02 parts of talc by weight per hundred parts of resin. The blend is fed into the hopper of the extruder. The blowing agent, which comprises isobutane, is fed into the extruder through the blowing agent injection port at a concentration of approximately 12 parts per 100 parts of the resin blend. The temperature in the zone of the extruder just prior to the point of entry of the blowing agent may be maintained at about 200° C. The molten polymer and blowing agent are thoroughly mixed and the molten admixture is forwarded through the pelletizer having a die with round holes of the desired size of the extrudate bead diameter. The extrudate is cut immediately at the die face by rapidly rotating rotor blades. The size of the cut beads depend upon the speed of the cutter and upon the speed with which the extrudate is coming from the die. By changing the speed of the cutter, the size of the beads can be regulated. The extrudate beads are kept under sufficient pressure to prevent appreciable expansion of the beads by the blowing agent which is dissolved or encapsulated in them, and the beads are suspended in water to form a slurry. The beads/water slurry moves through a temperature regulator zone where the temperature of the beads is regulated to the proper foaming temperature and they are expelled through a rotary type valve into ambient pressure and temperature. The sudden release of pressure causes the beads to expand. Once expanded, the beads are cooled, dried, and collected in a container. The polypropylene does not have to be crosslinked before foaming.

The polypropylene beads produced have a diameter of 0.25" and a density of approximately 2.1 pcf. Beads of smaller diameters can be produced through the use of smaller holes and faster cutter speeds.

EXAMPLE 6

As a specific example of practice of the present invention, the resin blend in Example 1 is dry blended with 7 parts of a chlorinated paraffin, 3 parts of antimony trioxide and 1 part of an ethoxylated amine, and 1.4 parts by weight of Atmos 150 per 100 parts by weight of resin, and the blend is fed into the hopper of the extruder. The blowing agent, which comprises isobutane, is fed into the extruder through the blowing agent injection port at a concentration of approximately 12 parts per 100 parts of polyethylene. The temperature in the zone of the extruder just prior to the point of entry of the blowing agent may be maintained at about 150° C. The molten polymer, antistatic agent, flame retardant agent and blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry are moved through a crosslinking zone where the water is heated. By the time the beads reach the end of crosslinking zone they are sufficiently crosslinked to achieve improved properties of the beads once they are expanded.

The crosslinked beads are then passed through a temperature regulator zone where the temperature of the beads is regulated to the proper foaming temperature (about 210° F.) and they are expelled through a rotary type valve into ambient pressure and temperature. The sudden release of pressure causes the beads to expand. Once expanded the beads are cooled, dried, and collected in a container.

The crosslinked polyethylene beads produced have a diameter of 0.25" and a density of approximately 2.0 pcf. Beads of smaller diameter can be produced through the use of smaller holes and faster cutter speeds.

EXAMPLE 7

As another example of the practice of the present invention, the resin blend in Example 1 is dry blended with 7 parts 2,4,6-tribromophenol, 3 parts antimony trioxide, 1 part ethoxylated amine, and 1.4 parts by weight of Atmos 150 per 100 parts by weight of resin, and the blend is fed into the hopper of the extruder. The blowing agent, which comprises isobutane, is fed into the extruder through the blowing agent injection port at a concentrations of approximately 12 parts per 100 parts of polyethylene. The temperature in the zone of the extruder just prior to the point of entry of the blowing agent may be maintained at about 150° C. The molten polymer, antistatic agent, flame retardant agent and blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry are moved through a crosslinking zone where the water is heated. By the time the beads reach the end of crosslinking zone they are sufficiently crosslinked to achieve improved properties of the beads once they are expanded.

The crosslinked beads are then passed through a temperature regulator zone where the temperature of the beads is regulated to the proper foaming temperature (about 210° F.) and they are expelled through a rotary type valve into ambient pressure and temperature. The sudden release of pressure causes the beads to expand. Once expanded, the beads are cooled, dried, and collected in a container.

The crosslinked polyethylene beads produced have a diameter of 0.25" and a density of approximately 2.0 pcf. Beads of smaller diameters can be produced through the use of smaller holes and faster cutter speeds.

EXAMPLE 8

As another example of practice of the present invention, the resin blend in Example 1 is mixed with 1.4 parts of Atmos 150 per 100 parts by weight of resin, and the blend is fed into the hopper of the extruder. The blowing agent, which comprises a blend made up of 60 parts by weight of 1-chloro-1,1-difluoroethane (HCFC 142b) and 40 parts by weight of chlorodifluoromethane (HCFC-22), is fed into the extruder through the blowing agent injection port at a concentration of approximately 18 parts per 100 parts of polyethylene. The temperature in the zone of the extruder just prior to the point of entry of the blowing agent may be maintained at about 150° C. The molten polymer, antistatic agent, flame retardant agent and blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry move through a crosslinking zone where the water is heated. By the time the beads reached the end of crosslinking zone they are sufficiently crosslinked to achieve improved properties of the beads once they are expanded.

The crosslinked beads then pass through a temperature regulator zone where the temperature of the beads is regulated to the proper foaming temperature (about 210° F.) and they are expelled through a rotary type valve into ambient pressure and temperature. The sudden release of pressure causes the beads to expand. Once expanded the beads are cooled, dried, and collected in a container.

The crosslinked polyethylene beads produced have a diameter of 0.25" and a density of approximately 2.0 pcf. Beads of smaller diameters can be produced through the use of smaller holes and faster cutter speeds.

EXAMPLE 9

In a further example of materials suitable for the practice of the present invention, the resin blend in Example 1 is mixed with 1.4 parts of Atmos 150 per 100 parts by weight of resin, and the blend is fed into the hopper of the extruder. The blowing agent, which comprises a blend made up of 8% of propane on a molar basis, 26% of n-butane on a molar basis and 66% of isobutane on a molar basis, is fed into the extruder through the blowing agent injection port at a concentration of approximately 12 parts per 100 parts of polyethylene. The temperature in the zone of the extruder just prior to the point of entry of the blowing agent may be maintained at about 150° C. The molten polymer, antistatic agent, flame retardant agent and blowing agent are thoroughly mixed and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry moves through a crosslinking zone where the water is heated. By the time the beads reached the end of crosslinking zone they are sufficiently crosslinked to achieve improved properties of the beads once they are expanded.

The crosslinked beads then pass through a temperature regulator zone where the temperature of the beads is regulated to the proper foaming temperature (about 210° F.) and they are expelled through a rotary type valve into ambient pressure and temperature. The sudden release of pressure causes the beads to expand. Once expanded the beads were cooled, dried, and collected in a container.

The crosslinked polyethylene beads produced have a diameter of 0.25" and a density of approximately 2.0 pcf. Beads of smaller diameters can be produced through the use of smaller holes and faster cutter speeds.

EXAMPLE 10

In a further example of materials suitable for the practice of the present invention, the resin blend in Example 1 is mixed with 1.4 parts of Atmos 150 per 100 parts by weight of resin, and the blend is fed into the hopper of the extruder. The blowing agent, which comprises a 1,1-difluoroethane (HFC-152a), is fed into the extruder through the blowing agent injection port at a concentration of approximately 18 parts per 100 parts of polyethylene. The temperature in the zone of the extruder just prior to the point of entry of the blowing agent may be maintained at about 150° C. The molten polymer, antistatic agent, flame retardant agent and blowing agent are thoroughly mixed, and the molten admixture is forwarded through the pelletizer and cut immediately at the die face as in Example 1. Again, the extrudate beads are kept under sufficient pressure to prevent appreciable expansion of the beads by the blowing agent which is dissolved or encapsulated in them, and the beads are suspended in water to form a slurry. The beads/water slurry moves through a crosslinking zone where the water is heated. By the time the beads reach the end of crosslinking zone they are sufficiently crosslinked to achieve improved properties of the beads once they are expanded.

The crosslinked beads then pass through a temperature regulator zone where the temperature of the beads is regulated to the proper foaming temperature (about 210° F.), and they are expelled through a rotary type valve into ambient pressure and temperature. The sudden release of pressure causes the beads to expand. Once expanded, the beads are cooled, dried, and collected in a container.

The crosslinked polyethylene beads produced have a diameter of 0.25" and a density of approximately 2.0 pcf. Beads of smaller diameters can be produced through the use of smaller holes and faster cutter speeds.

The above examples illustrate that crosslinked polyolefin foam beads suitable for molding can be produced by the extrusion of polyolefin type resins containing blowing agents, each as described above in the specification. However, these examples are not intended to be limiting, and it will be appreciated that variations and modifications may be made without departing from the spirit and scope of the invention. Thus, the scope of the present invention should be construed solely by reference to the appended claims.

I claim as my invention:

1. A die for a polymer extruder comprising:

a primary flow channel extending from a primary inlet port on one end of said die through to an orifice on an opposing end of said die; and a secondary flow channel extending from at least one secondary inlet port through to said orifice; wherein said secondary flow channel is substantially isolated from said primary flow channel.

2. The die of claim 1 wherein said at least one secondary inlet port is positioned along a side of said die.

3. The die of claim 1 wherein said primary flow channel and said secondary flow channel join at said orifice.

4. The die of claim 1 wherein said primary flow channel and said secondary flow channel join at an interchange upstream of said orifice.

5. An extension for a polymer extruder die, comprising:

a flow channel extending from an inlet port through to an exit port;

at least one injection port for injecting material into said flow channel;

a first temperature modulation zone having at least one passage proximate said flow channel; and a second temperature modulation zone having at least one passage proximate said flow channel.

6. The extension of claim 5, wherein said first and second modulation zones are separately controlled.

7. The extension of claim 5, wherein said at least one first modulation zone passage and at least one second modulation zone passage are each isolated from other passages and from said flow channel.

8. The extension of claim 5, wherein said extension is integrally formed with said die.

9. A polyolefin foam manufacturing system comprising:

an extruder for mixing and melting a polyolefin composition;

a high pressure unit for maintaining said composition at a pressure sufficient to substantially prevent foaming;

a discharge means for expelling said composition from said high pressure unit;

crosslinking means for inducing crosslinking in said composition; and regulator means for regulating the temperature of said composition;

wherein said high pressure unit receives said composition directly from said extruder.

10. The system of claim 9, wherein said crosslinking means is within said high pressure unit.

11. The system of claim 9, wherein said regulator means is within said high pressure unit.

12. The system of claim 9, wherein said high pressure unit comprises a pelletizer for cutting said composition into beads.

13. The system of claim 12, wherein said pelletizer is equipped with a high pressure pump enabling said pelletizer to maintain said composition under sufficient pressure to substantially prevent foaming.

* * * * *